US010726478B2

(12) United States Patent
Painter et al.

(10) Patent No.: US 10,726,478 B2
(45) Date of Patent: Jul. 28, 2020

(54) DATA PROCESSING SYSTEM AND METHOD FOR FACILITATING TRANSACTIONS WITH USER-CENTRIC DOCUMENT ACCESS

(71) Applicant: FAIR IP, LLC, Santa Monica, CA (US)

(72) Inventors: Scott Edward Painter, Los Angeles, CA (US); Bowen Li, Redondo Beach, CA (US); Mason Grey McLead, Redondo Beach, CA (US); Matthew Donovan Cragin, Los Angeles, CA (US); Craig Michael Nehamen, Sherman Oaks, CA (US)

(73) Assignee: FAIR IP, LLC, Santa Monica, CA (US)

( * ) Notice: Subject to any disclaimer, the term of this patent is extended or adjusted under 35 U.S.C. 154(b) by 289 days.

(21) Appl. No.: 15/873,697

(22) Filed: Jan. 17, 2018

(65) Prior Publication Data

US 2018/0204282 A1    Jul. 19, 2018

Related U.S. Application Data

(60) Provisional application No. 62/447,366, filed on Jan. 17, 2017, provisional application No. 62/596,007, (Continued)

(51) Int. Cl.
*G06Q 20/32* (2012.01)
*G06Q 40/02* (2012.01)
(Continued)

(52) U.S. Cl.
CPC ......... *G06Q 40/025* (2013.01); *G06Q 10/087* (2013.01); *G06Q 20/322* (2013.01); *G06Q 20/389* (2013.01); *G06Q 30/0623* (2013.01)

(58) Field of Classification Search
USPC .......................................... 705/38
See application file for complete search history.

(56) References Cited

U.S. PATENT DOCUMENTS 7,555,443 B2 * 6/2009 Chandran .......... G06Q 30/0201
                                                       705/1.1
7,797,166 B1   9/2010 Bradley
                (Continued)

OTHER PUBLICATIONS

Patents; Patent Application Titled "Dealers Electronic Exchange" Published Onlin Journal of Transportation [Atlanta] Jan. 17, 2015: 434. (Year: 2015).*

(Continued)

*Primary Examiner* — William E Rankins
(74) *Attorney, Agent, or Firm* — Sprinkle IP Law Group

(57) ABSTRACT

One embodiment comprises data processing system comprising a data store storing a set of inventory records for a program pool of vehicles, a processor and a memory coupled to the processor storing a set of computer executable instructions. The set of computer executable instructions may be executable to receive, from a mobile application, a selection of a vehicle from the program pool, retrieve the inventory record for the selected vehicle, create, at the server, an order to capture information about a transaction, receive a request from the mobile application to view an electronic document associated with the selected vehicle; responsive to the request to view the electronic document, automatically populate the electronic document with the order information; and communicate the electronic document to the mobile application for presentation in the operator interface of a mobile device.

22 Claims, 26 Drawing Sheets

Related U.S. Application Data filed on Dec. 7, 2017, provisional application No. 62/447,349, filed on Jan. 17, 2017.

(51) Int. Cl.
*G06Q 10/08* (2012.01)
*G06Q 30/06* (2012.01)
*G06Q 20/38* (2012.01)

(56) References Cited

U.S. PATENT DOCUMENTS

| | | | |
|---|---|---|---|
| 8,209,247 B2* | 6/2012 | Krautter | G06Q 20/10 |
| | | | 705/26.1 |
| 8,438,048 B1* | 5/2013 | Benavides, III | G06Q 40/08 |
| | | | 705/2 |
| 8,660,943 B1 | 2/2014 | Chirehdast | |
| 8,712,909 B1 | 4/2014 | Raubenheimer et al. | |
| 9,147,216 B2* | 9/2015 | Seergy | G06Q 30/06 |
| 9,501,772 B2* | 11/2016 | Sarkissian | G06Q 20/38215 |
| 9,785,793 B2 | 10/2017 | Lacey | |
| 1,045,312 A1 | 10/2019 | Garrity | |
| 2002/0029154 A1 | 3/2002 | Majoor | |
| 2003/0139990 A1 | 7/2003 | Greco | |
| 2006/0265258 A1 | 11/2006 | Powell et al. | |
| 2006/0277139 A1 | 12/2006 | Poltorak | |
| 2007/0022020 A1 | 1/2007 | Bernstein | |
| 2007/0094125 A1 | 4/2007 | Izyayev | |
| 2007/0192872 A1 | 8/2007 | Rhoads | |
| 2009/0157522 A1 | 6/2009 | Srinivasan et al. | |
| 2009/0299911 A1 | 12/2009 | Abrahams et al. | |
| 2010/0094740 A1 | 4/2010 | Richter | |
| 2010/0274571 A1 | 10/2010 | McFall et al. | |
| 2010/0293181 A1 | 11/2010 | Muller | |
| 2012/0005070 A1 | 1/2012 | McFall | |
| 2012/0265648 A1* | 10/2012 | Jerome | G06Q 40/00 |
| | | | 705/26.62 |
| 2013/0006916 A1 | 1/2013 | McBride et al. | |
| 2013/0120595 A1 | 5/2013 | Roach | |
| 2014/0172687 A1 | 6/2014 | Chirehdast | |
| 2014/0229363 A1 | 8/2014 | Orloff et al. | |
| 2014/0279533 A1* | 9/2014 | Hamilton | G06Q 40/00 |
| | | | 705/44 |
| 2014/0351129 A1 | 11/2014 | Finot | |
| 2015/0120489 A1 | 4/2015 | Edelman | |
| 2015/0235310 A1 | 8/2015 | Rozman et al. | |
| 2015/0293915 A1 | 10/2015 | Garg | |
| 2015/0319170 A1 | 11/2015 | Grossemy | |
| 2015/0339769 A1 | 11/2015 | deOliveira | |
| 2016/0042081 A1 | 2/2016 | Baker | |
| 2016/0125528 A1 | 5/2016 | Brown | |
| 2016/0166180 A1 | 6/2016 | Isaacson et al. | |
| 2016/0171603 A1 | 6/2016 | Amtrup | |
| 2016/0232546 A1 | 8/2016 | Ranft et al. | |
| 2016/0321726 A1 | 11/2016 | Singh et al. | |
| 2016/0360403 A1 | 12/2016 | Jordi et al. | |
| 2018/0204173 A1 | 7/2018 | Painter et al. | |
| 2018/0204253 A1 | 7/2018 | Painter et al. | |
| 2018/0204279 A1 | 7/2018 | Painter et al. | |
| 2018/0204280 A1 | 7/2018 | Painter et al. | |
| 2018/0204281 A1 | 7/2018 | Painter et al. | |
| 2019/0172001 A1 | 6/2019 | Painter et al. | |

OTHER PUBLICATIONS

International Search Report and Written Opinion for International Application No. PCT/US2018/14078, dated Mar. 9, 2018, 13 pages.
International Search Report and Written Opinion for International Application No. PCT/US2018/14080, dated Mar. 9, 2018, 11 pages.
International Search Report and Written Opinion for International Application No. PCT/US2018/14076, dated Mar. 9, 2018, 9 pages.
International Search Report and Written Opinion for International Application No. PCT/US18/14073, dated Mar. 20, 2018, 9 pages.
International Search Report and Written Opinion for International Application No. PCT/US18/14082, dated Apr. 4, 2018, 8 pages.
International Search Report and Written Opinion for International Application No. PCT/US18/14081, dated Apr. 9, 2018, 15 pages.
Office Action issued for U.S. Appl. No. 15/873,498, dated Sep. 3, 2019, 20 pages.
Office Action for U.S. Appl. No. 15/873,678, dated Jan. 23, 2020, 22 pgs.
Office Action for U.S. Appl. No. 15/873,452, dated Jan. 30, 2020, 24 pgs.
Office Action for U.S. Appl. No. 15/873,536, dated Feb. 5, 2020, 24 pgs.
Office Action for U.S. Appl. No. 15/873,518, dated Apr. 27, 2020, 10 pgs.
Office Action for U.S. Appl. No. 15/873,498, dated Apr. 29, 2020, 21 pgs.
Office Action for U.S. Appl. No. 15/873,452, dated May 19, 2020, 8 pgs.
Office Action for U.S. Appl. No. 15/873,678, dated May 19, 2020, 9 pgs.

* cited by examiner

Stock #: P640280
Mileage: 23,833
Vehicle Price: $20,881.00

What is the current mileage of the vehicle?

23833

Next

Customer did not show up or did not finish the checkout?

FIG. 7O

| One Time Fees | | Price |
|---|---|---|
| | Stock #: P640280 | |
| | Mileage: 23,833 | |
| | Vehicle Price: $20,881.00 | |
| Registration | | $0 |
| License | | $0 |
| Transfer | | $0 |
| Smog | | $0 |
| CA Tire (Only if new tires) | | $29 |
| Electronic Title | | |
| Documentation Fee | | $80.00 |
| Total: | | $109.00 |

```
{
    "cpo_fee": {
        "value": null,
        "encrypted": false
    },
    "doc_fee": {
        "value": "80.00",
        "encrypted": false
    },
    "vehicle_vin": {
        "value": "5UXWZ7C57H0V84844",
        "encrypted": false
    },
    "payment_date": {
        "value": "21st",
        "encrypted": false
    },
    "vehicle_make": {
        "value": "BMW",
        "encrypted": false
    },
    "vehicle_year": {
        "value": "2017",
        "encrypted": false
    },
    "customer_name": {
        "value": ["person/first_name/0325b3bad646ae15890ec35419a06794", "person/last_name/43c1b511aa4afd00349b90412212b109"],
        "encrypted": true
    },
    "vehicle_model": {
        "value": "X3",
        "encrypted": false
    },
    "agreement_date": {
        "value": "2017/12/20",
        "encrypted": false
    },
    "garage_address": {
        "value": ["person/address/address_1/3301ac0d5758ec9ba680338cb1b9823c", "person/address/address_2/36920c9d52cabab8350ec4d94aa3d204"],
        "encrypted": true
    },
    "miles_per_year": {
        "value": "10,000",
        "encrypted": false
```

```
        },
        "vehicle_status": {
                "value": "Pre-owned",
                "encrypted": false
        },
        "total_start_fee": {
                "value": "1,713.42",
                "encrypted": false
        },
        "vehicle_mileage": {
                "value": "7,258",
                "encrypted": false
        },
        "customer_address": {
                "value": ["person/address/address_1/3301ac0d5758ec9ba680338cb1b9823c",
"person/address/address_2/36920c9d52cabab8350ec4d94aa3d204"],
                "encrypted": true
        },
        "vehicle_start_fee": {
                "value": "1,250.00",
                "encrypted": false
        },
        "warranty_category": {
                "value": "Limited Warranty",
                "encrypted": false
        },
        "customer_last_name": {
                "value": "person/last_name/43c1b511aa4afd00349b90412212b109",
                "encrypted": true
        },
        "electronic_reg_fee": {
                "value": "29.00",
                "encrypted": false
        },
        "first_payment_date": {
                "value": "01/21/18",
                "encrypted": false
        },
        "customer_first_name": {
                "value": "person/first_name/0325b3bad646ae15890ec35419a06794",
                "encrypted": true
        },
        "vehicle_description": {
                "value": "2017 Space Gray Metallic BMW X3",
                "encrypted": false
```

```
        },
        "garage_city_state_zip": {
                "value": "Metropolis, CA 07777",
                "encrypted": false
        },
        "lowest_miles_per_year": {
                "value": "10,000",
                "encrypted": false
        },
        "overage_cost_per_mile": {
                "value": "15¢",
                "encrypted": false
        },
        "reg_transfer_smog_fee": {
                "value": "$125.00",
                "encrypted": false
        },
        "fair_insurance_payment": {
                "value": "113.04",
                "encrypted": false
},
        "vehicle_exterior_color": {
                "value": "Space Gray Metallic",
                "encrypted": false
        },
        "customer_city_state_zip": {
                "value": "Metropolis, CA 07777",
                "encrypted": false
        },
        "miles_per_year_increase": {
                "value": "0",
                "encrypted": false
        },
        "start_fee_plus_fees_tax": {
                "value": "116.38",
                "encrypted": false
        },
        "vehicle_monthly_payment": {
                "value": "$565.50",
                "encrypted": false
```

```
        },
        "vehicle_stock_photo_url": {
                "value": "http://media.service.com/MediaGallery/media/MzA3O /
cc_2017BMS200001_640_300.png",
                "encrypted": false
        },
        "cost_per_additional_mile": {
                "value": "11¢",
                "encrypted": false
        },
        "did_purchase_extra_miles": {
                "value": "false",
                "encrypted": false
        },
        "maintenance_contract_url": {
                "value": "https://api.stage-secure.foobar.eng /api/v1/orders/2634/contracts/
preview?pdf=true&contract_type=vehicle_maintenance_plan",
                "encrypted": false
        },
        "monthly_total_tax_amount": {
                "value": "$45.50",
                "encrypted": false
        },
        "upfront_addons_purchased": {
                "value": true,
                "encrypted": false
        },
        "recurring_addons_purchased": {
                "value": true,
                "encrypted": false
        },
        "limited_warranty_contract_url": {
                "value": "https://api.stage-secure.foobar.eng/api/v1/orders/2634/contracts/
preview?pdf=true&contract_type=vehicle_limited_warranty",
                "encrypted": false
        },
        "monthly_cost_of_extra_mileage": {
                "value": null,
                "encrypted": false
```

FIG. 8D

```
        },
        "excess_wear_protection_payment": {
                "value": "$52.00",
                "encrypted": false
        },
        "vehicle_monthly_payment_no_tax": {
                "value": "$520.00",
                "encrypted": false
        },
        "roadside_assistance_contract_url": {
                "value": "https://api.stage-secure.foobar.eng/api/v1/orders/2634/contracts/preview?pdf=true&contract_type=roadside_assistance",
                "encrypted": false
        },
        "vehicle_monthly_payment_with_tax": {
                "value": "$730.54",
                "encrypted": false
        },
        "did_purchase_excess_wear_protection": {
                "value": "true",
                "encrypted": false
        },
        "excess_wear_protection_contract_url": {
                "value": "https://api.stage- secure.foobar.eng /api/v1/orders/2634/contracts/preview?pdf=true&contract_type=excess_wear_and_tear",
                "encrypted": false
        },
        "fair_vehicle_insurance_policy_purchased": {
                "value": "true",
                "encrypted": false
        },
        "vehicle_cheapest_monthly_payment_no_tax": {
                "value": "$520.00",
                "encrypted": false
        },
        "limited_powertrain_warranty_contract_url": {
                "value": null,
                "encrypted": false
        }
}
```

DATA PROCESSING SYSTEM AND METHOD FOR FACILITATING TRANSACTIONS WITH USER-CENTRIC DOCUMENT ACCESS

RELATED APPLICATIONS

This application claims priority under 35 U.S.C. § 119(e) to U.S. Provisional Application No. 62/447,366, entitled "Computer System and Method for Facilitating Transactions Using a Mobile Device," filed Jan. 17, 2017, U.S. Provisional Application No. 62/596,007, entitled "Data Processing System and Method for Managing Location Independent Transactions," filed Dec. 7, 2017 and U.S. Provisional Application No. 62/447,349, entitled "Networked Vehicle Data System," filed Jan. 17, 2017, each of which is fully incorporated herein by reference for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

The present disclosure relates generally to rules/model-based data processing systems. More particularly, embodiments relate to data processing systems and method to facilitate transactions. Even more particularly, embodiments relate to data processing systems and methods that facilitate transactions using a user-centric document flow.

BACKGROUND

In recent years, Internet-based systems and other computer systems that facilitate purchasing (buying or leasing) automobiles have become increasingly important tools for both consumers and dealers. For example, vehicle search services provided through the Internet have revolutionized the process of searching for a vehicle and dealer management systems (DMS) have transformed the management of finance, sales, parts, inventory and administration of other aspects of running a dealership. Despite the prevalence of these tools, the purchase process remains highly fractured.

The purchase process through a dealership typically involves several distinct steps including: i) vehicle search and selection, ii) a test drive, iii) price negotiation, iv) third party loan approval, v) selection of financing and insurance (F&I) options, vi) document generation and execution. In a typical scenario, a consumer looking to purchase a vehicle wanders dealer lots or uses disparate web sites provided by dealers and third parties to locate vehicles of interest. If the consumer chooses to finance the vehicle, the consumer may also go to a bank or use the bank's web site to apply for a loan. In addition or in the alternative, the consumer may choose to finance the vehicle through a loan process facilitated by the dealer's sales desk or F&I department, in which case the dealer will interact with one or more loan providers to submit loan applications for the consumer.

When the consumer finds a vehicle of interest, the consumer may schedule a test drive with the dealership and, if the consumer chooses to purchase the vehicle, negotiate a price with the dealer. In some cases, technology may facilitate the negotiation. For example, several third-party vehicle search sites are available that allow consumers to research market prices. This can give the consumer confidence walking into the dealership, but serves largely as a negotiation tool. The negotiated price still relies on back and forth negotiation until, optimally, both the consumer and dealer reach the subjective belief that they came to a fair deal.

After negotiating a price with the salesperson, the consumer then goes to the F&I office to workout payment through cash, a loan arranged by the consumer or a loan arranged through the sales desk or F&I office. Prior to finalizing the deal, the F&I office typically tries to sell the consumer additional options such as warranties, paint protection packages, VIN etching or other "insurance" products. This may be the most confusing part for the consumer as the consumer must quickly balance the risk of damage, theft or malfunction with the price of the product being offered.

After the consumer selects the F&I products, the F&I employee enters the final data in the dealer management system. This may require entering information received from the salesperson, consumer, or financial institution and, some cases, reentering information already entered in other systems. Based on these inputs, the dealer management system generates and prints the relevant documents for signature. Often, this is the first time the consumer sees the final contract terms and price, which often includes additional fees, such as document fees or other dealer added fees. Thus, conventional systems are dealer-centric because documents are generated and controlled by a DMS controlled by the dealer and to which the customer has no access.

Despite the high information disadvantage faced by consumers, consumers often give the documents presented by a dealer little more than a cursory review because it is difficult for consumers to back out of the deal at this point due to the high transaction costs. For example, if a consumer decides to cancel a deal after all the documents are finalized, the consumer must go back and repeat the vehicle selection, negotiation, selection of F&I options and, in some cases, the third party loan approval process. These costs are exacerbated if the consumer elects to go to another dealership.

The high transaction costs result in part from the fragmented and incomplete technologies used in the vehicle purchase process. Typically, the consumer must use one system to search for inventory and then another system to request a loan. There is often limited or no coordination between these systems and the consumer may have to setup separate accounts with the systems, provide duplicative information and interact with the systems through different web sites or mobile apps. Furthermore, the dealer may track or otherwise manage sales, finance, parts, service, inventory and back office administration using a dealer management system that has little or no interaction with the inventory search systems or the loan provider systems. Consequently, the consumer must provide duplicative information to the dealer for the dealer to enter into the DMS. Moreover, the consumer or dealer may have to coordinate with a loan provider so that the dealer can enter loan information. Thus, there are significant breaks in data flow that can lead to errors and substantial data duplication.

Furthermore, the document flow was traditionally managed by the DMS and is thus dealer-centric. More particularly, documents that the user had to review and execute as part of the purchase were generated by the DMS at the dealership. The control of documents by the dealer's system makes it difficult, if not impossible, for a consumer to review documents prior agreeing to final terms.

SUMMARY

One embodiment comprises data processing system comprising a data store storing a set of inventory records for a program pool of vehicles, each inventory record including a payment schedule comprising an initial fee and a periodic fee for an associated vehicle, a processor and a memory coupled to the processor storing a set of computer executable instructions. The set of computer executable instructions may be executable to receive, from a mobile application, a selection of a vehicle from the program pool by a user, retrieve the inventory record for the selected vehicle and provide vehicle information from the inventory record for the selected vehicle to the mobile application for display in an operator interface of a mobile device, create, at the server, an order to capture information about a transaction and store order information in the order at the server, the order information comprising user information about the user and the vehicle information about the selected vehicle from the inventory record for the selected vehicle. The set of computer executable instructions may be further executable to provide, by the server, access to the order via a dealer portal to allow a dealer associated with the selected vehicle to update order information, receive a request from the mobile application to view an electronic document associated with the selected vehicle, responsive to the request to view the electronic document, populate the electronic document with the order information and communicate the electronic document to the mobile application for presentation in the operator interface of a mobile device.

According to one embodiment, the set of computer executable instructions is further executable to generate a unique activation code linked to the order and provide the unique activation code to the mobile application. The unique activation code may be usable by the dealer portal to access the order. The server can be configured to push order information to the dealer portal in response to receiving an activation code signal from the dealer portal including the unique activation code.

The set of computer executable instructions may be further executable to receive order parameters from the mobile application, the order parameters comprising vehicle features and a selection of an additional product. According to one embodiment, a final payment based on the payment schedule for the selected vehicle and a payment for the additional product can be selected. An approval rule can be applied to the order. According to one embodiment, the set of computer executable instructions is further executable to receive, at the server, an indication from the mobile application that the order is finalized and apply the approval rule responsive to the indication that the order is finalized.

The set of computer executable instructions is further executable to populate a final copy of an electronic agreement document from the order based on a determination that the order is approved and provide the final copy of the electronic agreement to the mobile application for presentation to the user. According to one embodiment, the final copy of the electronic agreement is an electronically executable document, executable by the user via the operator interface of mobile device. The server may receive an electronic signature from the user for the final copy the electronic agreement.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 7A, FIG. 7B, FIG. 7C, FIG. 7D, FIG. 7E, FIG. 7F, FIG. 7G, FIG. 7H, FIG. 7I, FIG. 7J, FIG. 7K, FIG. 7L, FIG. 7M, FIG. 7Q, FIG. 7R, FIG. 7S, FIG. 7T, FIG. 7U illustrate one embodiment of a series of mobile application pages corresponding to a purchase process and FIG. 7N, FIG. 7O and FIG. 7P illustrate example dealer portal pages corresponding to a purchase transaction.

FIG. 8A, FIG. 8B, FIG. 8C, FIG. 8D, and FIG. 8E illustrate an embodiment of a structured document containing order data that can be transformed into a contract.

DETAILED DESCRIPTION

Figure 1:
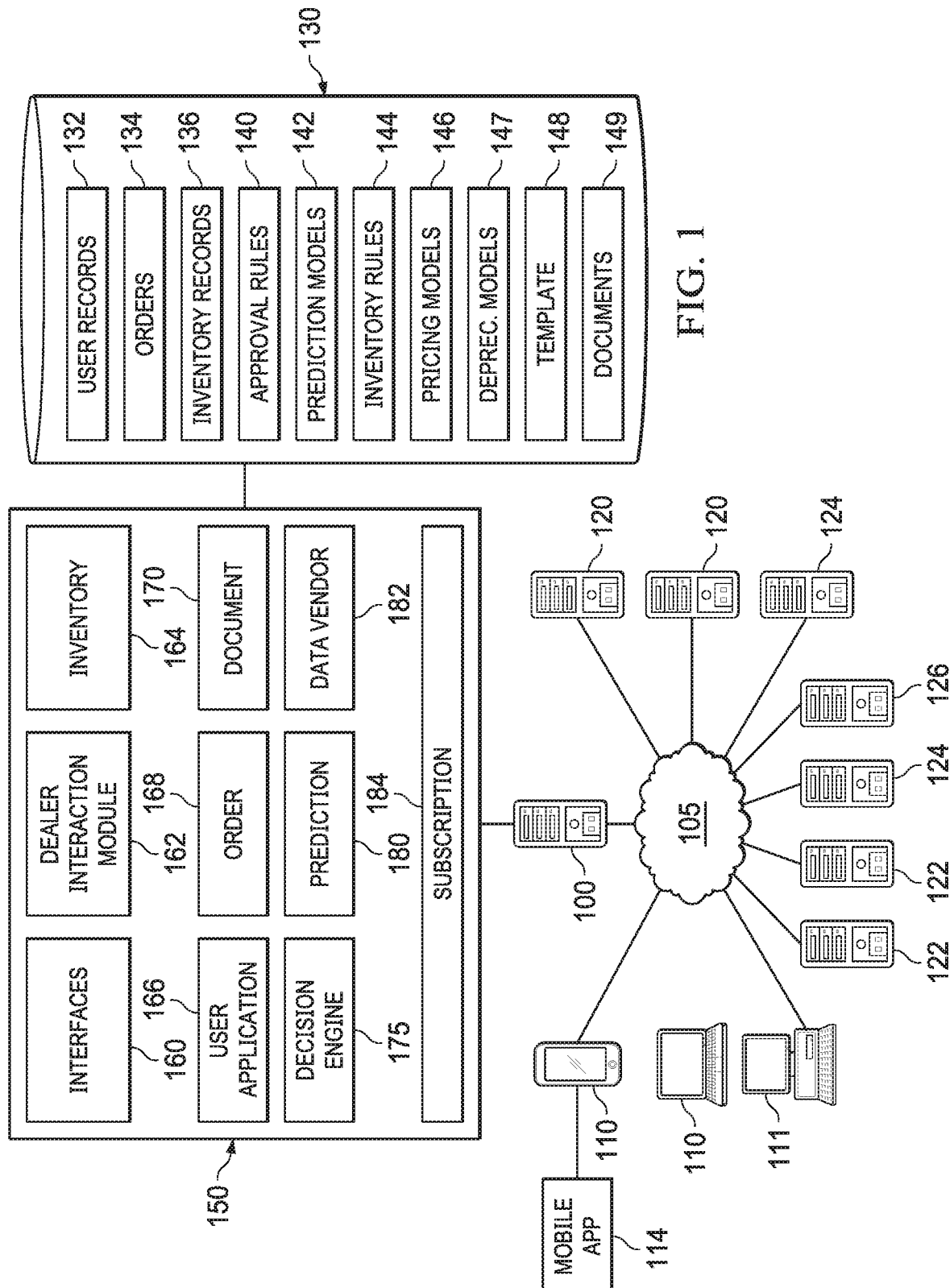
FIG. 1 is a high level block diagram of one embodiment of a network topology.

The invention and various features and advantageous details thereof are explained more fully with reference to the exemplary, and therefore non-limiting, embodiments illustrated in the accompanying drawings and detailed in the following description and appendices. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments described herein provide a rules/model-based data processing system that facilitates inventory selection and document generation. According to one embodiment, a computer system provides a program pool of vehicles that reduces the large number of vehicles that a consumer must typically search through. The inventory items made available for selection by the user in the client application may be specifically curated for that user by the computer system based on the user's ability to afford the inventory items. The computer system can pre-calculate the payment schedules for each inventory items and independently "pre-approve" financing for the consumer. The computer can thus limit the inventory items presented to the user based on the user's approved payment amount.

When a user selects a vehicle via a client application, the computer system may thus already have the payment information for an inventory item, consumer information, and seller information. In accordance with some embodiments, the computer system may provide the consumer with independent access to view a set the documents associated with purchasing an inventory item. The computer system can automatically generate previews of the purchase documents as the purchase process progresses, generate final purchase documents and provide the purchase documents (e.g., ownership agreement, registration form, liability release of seller) to the user for digital execution.

Thus, according to one embodiment, the computer system can pre-calculate the initial payment and monthly payments for each inventory item and may curate a set of inventory items for presentation to the user for purchase. Furthermore, the computer system may "pre-approve" financing for the consumer (e.g., up to $X amount per month or $Y amount total). The computer system can further automatically generate purchase documents and provide the consumer with access to documents the consumer will sign when he or she goes to purchase a vehicle (e.g., ownership agreement, registration form, liability release of dealer). In this way, there can be both "pre-approval" for financing and documents generated in real-time as requested by the consumer. According to one embodiment, the consumer has no need to sign any paper forms at the seller's place of business. In the context of an automobile purchase, this can remove the wait for the financing and insurance (F&I) office to prepare documents that can often take hours and as well remove the need for the consumer to store any physical forms. Consequently, the consumer, prior to going to the seller, can be familiar with the documents that he or she is going to execute. As such, the consumer may have greater confidence that the purchase is above board.

The computer system may provide a seller portal (e.g., a dealer portal) to allow a seller to enter information associated with orders. The dealer portal may be connected to the client application via a server such that changes to an order through the dealer portal or client app can be synchronized by the computer system.

According to one embodiment, the computer system may provide the consumer with an activation code that is associated with a consumer profile and can be used by the dealer to initiate a transaction. The consumer or the computer system can provide the activation code to the dealer and the dealer can use the dealer portal to enter the activation code, information about a vehicle-of-interest, dealer bank account information or other information. Based on the activation code, the computer system can provide the dealer with access to the consumer profile associated with the activation code to view information about the consumer, such as compliant personally identifiable information, a copy of the consumer's driver's license or a picture of the consumer, and financing information (e.g., approval amount). Furthermore, the dealer may also access, via the dealer portal, a set of documents associated with the transaction and finalize any additional items required for finalization, like vehicle odometer at the moment of sale.

When a user approves an order (e.g., after reviewing one or more versions of an "order review" interface), the computer system can generate a final copy of the ownership agreement and other documents associated with the order and push the document(s) to the client application for signature on a client computing device (e.g., a mobile device). Upon receiving a digital signature by the consumer, the computer system can interact with the consumer's bank's computer system to withdraw an initial payment from the consumer's bank account and transfer funds to purchase the vehicle from the financing provider's bank to the seller's bank.

Embodiments of a system for facilitating transactions may be implemented in a network topology. FIG. 1 is a high level block diagram of one embodiment of an example topology. The network topology of FIG. 1 comprises an automotive data processing system 100 which is coupled through network 105 to client computing devices 110 (e.g. computer systems, personal data assistants, smart phones or other client computing devices). The topology of FIG. 1 further includes one or more information provider systems 120, one or more dealer management systems (DMS) 122, inventory systems 124, department of motor vehicles (DMV) systems 126 or other systems. Network 105 may be, for example, a wireless or wireline communication network such as the Internet or wide area network (WAN), publicly switched telephone network (PSTN) or any other type of communication link.

In accordance with one aspect of the present disclosure, automotive data processing system 100 provides a comprehensive computer system for automating and facilitating a purchase process including financing qualification, inventory selection, document generation and transaction finalization. Using a client application 114 executing on a client device 110, a consumer user may apply for financing, search dealer inventory, select a vehicle of interest from a dealer and review and execute documents related to the purchase of the vehicle, and execute automated clearing housing (ACH) transactions through automotive data processing system 100 to purchase the vehicle from the dealership. The automotive data processing system 100 may initiate the consumer's fee payments through various payment methods. Automotive data processing system 100 may be provided by or behalf of an intermediary that finances the purchase of a vehicle by a consumer from the dealer. In this context, a "consumer", is any individual, group of individuals, or business entity seeking to purchase a vehicle (or other asset) via the system 100.

Turning briefly to the various other entities in the topology FIG. 1, dealers may use a DMS 122 to track or otherwise manage sales, finance, parts, service, inventory and back office administration needs. Since many DMS 122 are Active Server Pages (ASP) based, data may be obtained directly from a DMS 122 with a "key" (for example, an ID and Password with set permissions within the DMS 122) that enables data to be retrieved from the DMS 122. Many dealers may also have one or more web sites which may be accessed over network 105, where inventory and pricing data may be presented on those web sites.

Inventory systems 124 may be systems of, for example, one or more inventory polling companies, inventory management companies or listing aggregators which may obtain and store inventory data from one or more of dealers (for example, obtaining such data from DMS 122). Inventory polling companies are typically commissioned by the dealer to pull data from a DMS 122 and format the data for use on web sites and by other systems.

DMV systems 126 may collectively include systems for any type of government entity to which a user provides data related to a vehicle. For example, when a user purchases a vehicle it must be registered with the state (for example, DMV, Secretary of State, etc.) for tax and titling purposes. This data typically includes vehicle features (for example, model year, make, model, mileage, etc.) and sales transaction prices for tax purposes. Additionally, DMVs may maintain tax records of used vehicle transactions, inspection, mileages, etc.).

Information provider systems 120 may be systems of entities that provide information used in approving a user or purchase. Examples of information provider systems 120 may include computer systems controlled by credit bureaus, fraud and ID vendors, vehicle data vendors or financial institutions. A financial institution may be any entity such as a bank, savings and loan, credit union, etc. that provides any type of financial services to a participant involved in the purchase of a vehicle. Information provider systems 120 may comprise any number of other various sources accessible over network 105, which may provide other types of desired data, for example, data used in identity verification, fraud detection, credit checks, credit risk predictions, income predictions, affordability determinations, residual value determinations or other processes.

Automotive data processing system 100 may comprise one or more computer systems with central processing units executing instructions embodied on one or more computer readable media where the instructions are configured to perform at least some of the functionality associated with embodiments of the present invention. These applications may include a vehicle data application 150 comprising one or more applications (instructions embodied on a computer readable media) configured to implement one or more interfaces 160 utilized by the automotive data processing system 100 to gather data from or provide data to client computing devices 110, information provider systems 120, DMS 122, inventory systems 124, DMV systems 126 and processing modules to process information.

Automotive data processing system 100 utilizes interfaces 160 configured to, for example, receive and respond to queries from users at client computing devices 110 interface with information provider systems 120, DMS 122, inventory systems 124, DMV systems 126, obtain data from or provide data obtained, or determined by automotive data processing system 100 to any of information provider systems 120, DMS 122, inventory systems 124, DMV systems 126. It will be understood that the particular interface 160 utilized in a given context may depend on the functionality being implemented by automotive data processing system 100, the type of network 105 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, APIs, libraries or other type of interface which it is desired to utilize in a particular context.

Vehicle data application 150 can comprise a set of processing modules to process obtained data or processed data to generate further processed data. Different combinations of hardware, software, and/or firmware may be provided to enable interconnection between different modules of the system to provide for the obtaining of input information, processing of information and generating outputs.

In the embodiment of FIG. 1, vehicle data application 150 includes a dealer interaction module 162 which can provide a service to allow dealers to register with automotive data processing system 100 to allow vehicles to be purchased through automotive data processing system 100. To onboard a dealer, a dealer account may be established at automotive data processing system 100. Various pieces of information may be associated with the dealer account. Once a dealer is on-boarded, dealer interaction module 162 may provide a dealer portal (e.g., a web site, web service) through which the dealer may access and update information for transactions using, for example, a browser at dealer computer 111. The dealer portal may also include a history of previously completed deals and other information.

As part of onboarding, automotive data processing system 100 can be provided with credentials or other information to allow automotive data processing system 100 to access dealer inventory information from the dealer's DMS 122 or an inventory system 124. In addition or in the alternative other channels may be established to retrieve inventory information (e.g., email, FTP upload or other channel).

The dealer may provide any forms that are required during a sales transaction. For example, state DMVs often mandate specific disclosures and some dealers have their own required disclosure documents that go beyond what is required by the government. The dealer may also provide bank account information to allow funds to be transferred to the dealer to purchase vehicles.

Inventory module 164 receives inventory feeds from remote sources via the channels established with the dealers, enhances the inventory records with information from other, distributed sources, and applies inventory rules 144 to the inventory records to filter the inventory items down to a program pool of inventory items that have a fair value (in this context, whether an inventory item has a "fair value" is objectively determined based on the rules applied). In accordance with one embodiment, the rules are selected such that each inventory item (e.g., vehicle) in the program pool is priced close to its wholesale value, current market value or other value at the time of sale and can be accurately and competitively priced based on selected metrics.

Inventory rules 144 may further include rules for pricing vehicles based, for example, on a pricing model 146. Automotive data processing system 100 uses the model, or, more particularly, depreciation models 147 derived from the model 146, to accurately determine an initial payment and monthly (or other periodic) payments for each inventory item. The payments may be selected to meet particular metrics. As discussed below, the payments for each vehicle may include payments to cover the modeled depreciation of the vehicle in addition to other products.

In some embodiments, system 100 may determine an array of payments for each vehicle, the array containing payments for multiple mileage and credit risk bands. Inventory module 164 may store an inventory record 136 for each vehicle in the vehicle pool, the inventory records containing data obtained from inventory feeds, enhanced data from information provider systems 120 and payment schedules. Inventory module 164 may further search inventory records 136 in response to search criteria received from client application 114 or other modules and returns responsive results.

User application module 166 is configured to interact with consumer users accessing system 100 via client applications 114 to obtain appropriate input information from the users to populate user applications for financing. User application module 166 further manages the user applications through an application approval lifecycle. Applications may be persisted as application records (user records) 132.

A decision engine 175 applies approval rules 140 to user application data provided by user application module 166 to approve or deny the application. Examples of approval rules 140 include, but are not limited to, fraud detection rules, identity verification rules, credit check rules, income verification rules and affordability rules. If an application is not approved, decision engine 175 may return the reason that the application was not approved. A failure to pass the approval rules may result in any configured action, such as withholding further information or services from the consumer, requesting the consumer re-enter information or provide additional information, and/or alerting an authority that of the failed check. If an application is approved, the decision engine may return one or more scores including, for example, an affordability score and a credit risk score, which can be added to the application for the user. The scores may be automatically used as search criteria for searching inventory records 136.

The application of approval rules 140 or other processes may leverage predictions. Prediction module 180 can apply prediction models 142 to data associated with the user application to generate prediction scores that may be used in processing the approval rules 140 or to enhance an application. By way of example, but not limitation, automotive data processing system 100 may apply an income prediction model to generate a prediction of a user's income that can be used by an affordability rule to determine an affordability score for the user. As another example, automotive data processing system 100 may apply a credit risk prediction model to generate a credit risk score for a consumer.

Approval rules 140 and prediction models 142 may require obtaining information from a number of third party distributed systems. As an example, application of an identity verification rule may require gathering information from an identity verification service provided by an information provider system 120. As another example, an income prediction model may require interacting with the computer systems of the user's bank to verify the consumer's current and recent income, as well as other relevant banking data.

Based at least in part on some of the user application data, a data vendor module 182 may perform interaction with one or more third party sources to obtain various types of information used in apply approval rules 140 and prediction models 142. For example, data vendor module 182 may interact, via appropriate APIs, with information provider systems 120 to collect fraud detection data, identity verification data, credit reports, income estimation data, income projection data and other data.

Order module 168 is configured to interact with consumer users accessing system 100 via client applications 114. Order module 168 is configured to obtain appropriate input information from the users, e.g., via one or more interactive GUIs, other modules or third party systems to populate order profiles and orders that contain data for purchase decisions. Order module 168 may further interact with the dealer portals to alert dealers of orders involving that dealer and allow dealers to update and approve orders. Order module 168 can manage the user orders through an order lifecycle. Orders 134 may be persisted as records in data store 130.

A document module 170 can receive order data from order module 168. Document module 170 may access a template of a contract from a library of templates 148, generate an HTML, PDF or other version of the contract by populating the template with data from the order and return the generated contract to the order module 168. The generated document can be provided to client application 114 to allow the user to preview a contract or execute a finalized contract. Automotive data processing system 100 may also maintain a library of other documents 149, such as wear and tear contracts, warranty information, insurance policy documents that may be returned to a user.

System 100 can store or generate documents that may be required by the intermediary, dealers, governmental organizations or others during the purchase process. Consequently, a consumer can review digital copies of, for example, an ownership agreement and any other ancillary documents that the consumer will likely have to execute in the purchase process. In some cases, some of the documents may be dealer specific or may be optional and may only become available to the consumer after he or she has selected a vehicle of interest or specific F&I options. In any case, in some embodiments, the consumer, prior to the consumer going to the dealership, may review, on his or her client computing device 110, all or a selected portion of the documents that will or may require execution.

System 100 and mobile application 114 may cooperate to present a list of vehicles to the consumer based on the payments determined for the vehicles, the consumer's affordability score as well as filter criteria provided by the user and vehicle payment parameters provided by the consumer or determined by system 100, while excluding vehicles that do not fit these criteria.

Subscription module 184 may receive a payment schedules and financial information from orders and interact with financial institutions to execute the payment schedules.

Furthermore, automotive data processing system 100 may include data store 130 operable to store obtained data, processed data determined during operation and rules/models that may be applied to obtained data or processed data to generate further processed data. In one embodiment, automotive data processing system 100 maintains user applications, orders and inventory objects. Further, in the embodiment illustrated, data store 130 is configured to store rules/models used to analyze application data, order data and inventory data, such as application approval rules 140, inventory rules 144, prediction models 142, pricing models 146 and depreciation models 147. Data store 130 may comprise one or more databases, file systems or other data stores, including distributed data stores managed by automotive data processing system 100.

Client computing devices 110, 111 may comprise one or more computer systems with central processing units executing instructions embodied on one or more computer readable media where the instructions are configured to interface with automotive data processing system 100. A client computing device 110, 111 may comprise, for example, a desktop, laptop, smart phone or other device. According to one embodiment, a client computing device 110 is a mobile device that has a touchscreen display and relies on a virtual keyboard for user data input. Client application 114 may be a mobile application ("mobile app") that runs in a mobile operating system (e.g., Android OS, iOS), and is specifically configured to interface with automotive data processing system 100 to generate application pages for display to a user. In another embodiment, the client application 114 may be a web browser on a desktop computer or mobile device. A client computing device 111 may run an application through which a dealer portal can be accessed.

In accordance with one embodiment, a user can utilize client application 114 to register with automotive data processing system 100, apply for financing, view inventory, select an inventory item, review documents and finalize a sales transaction through a low friction mobile app running on a smart phone. Client application 114 can be configured to communicate data to/from automotive data processing system 100 and generate a user interface for inputting one or more pieces of information or displaying information received from automotive data processing system 100. In some embodiments, the application 114 may comprise a set of application pages through which application 114 collects information from the user or which client application 114 populates with data provided via an interface 160.

Any type of information may be received from the consumer user in accordance with embodiments of the present disclosure, including consumer information, (such as personally identifiable information (PII) and financial information for that user), order parameters, such as vehicle features (such as the make, model, year, mileage, trim, or other characteristics of a specific vehicle or group of vehicles in which the consumer is interested) and order payment parameters (other parameters that affect the monthly payment, such selections of additional products, an indication of expected usage or other parameters) or other information.

As discussed above, a user may apply for financing via client application 114. To this end, client application 114 may be configured with a series of application pages configured to collect user application data and display user application data. The data may be maintained at the client device 110 in a local representation of a user application (a data structure configured to hold user application data). The local representation may include application data to be sent to automotive data processing system 100 or received from automotive data processing system 100.

Client application 114 can be configured to request a minimum amount of user identification information and financial information from a consumer to allow automotive data processing system 100 to make a determination of whether the user is approved to purchase a vehicle and the vehicles for which the user is approved. Preferably the mobile application pages are configured to minimize the number of fields that the user must populate for an approval determination to be made. The user supplied user identification information can be used to obtain additional consumer information from a variety of information provider systems 120.

In one embodiment, an application page of mobile application 114 is configured to allow a user to input an image of an identification document for the user. The image of the user identification document is used to obtain PII for the user using an internal library or a remote information provider system 120. Automotive data processing system 100 may use the PII input directly by the user, obtained using the user identification document image, or otherwise obtained to obtained additional consumer information, including financial information, associated with the consumer from information provider systems 120.

If the user application is approved, system 100 and mobile application 114 may cooperate to present a list of vehicles to the consumer based on the payments determined for the vehicles, the consumer's affordability score as well as filter criteria provided by the user and order payment parameters provided by the consumer or determined by system 100, while excluding vehicles that do not fit these criteria.

In response to a selection of a vehicle from the list, mobile application 114 and system 100 may cooperate to present additional details of a vehicle to the user. In some embodiments, system 100 may provide the array of payments associated with the vehicle to mobile application 114. Mobile application can be configured to display a default payment as well as provide payment parameter controls to adjust order payment parameters. Responsive to user input using the payment parameter controls, the mobile application can update the payment displayed. In this example, the mobile application does not have to request additional data from system 100 to update the displayed payment in response to the inputs because the payment array is resident at mobile application 114. Thus, the number of network calls can be reduced compared to web based systems that required a browser to call back to the server each time a user adjusted some parameter that affected payment. In other embodiments, the mobile application may call back to system 100 to receive an updated payment amount each time the user adjusts a payment parameter.

When the user is satisfied with his/her selections, the user can select to complete an order via mobile application 114. Prior to finalizing the order, the system 100 may use consumer information to conduct an additional credit check. A failure to pass the credit check may result in any configured action, such as withholding further information or services from the consumer, requesting the consumer re-enter information or provide additional information, and/or alerting an authority that of the failed identification verification.

System 100 can notify the dealer selling the vehicle subject to an order of the order and the dealer can access the order via a dealer portal for review. The dealer may be required to add additional information to the order, such as current odometer reading. System 100 electronically generates the purchase contract for and sends the purchase contract to mobile application 114 for electronic signature by the user.

It should be noted here that not all of the various entities depicted in the topology are necessary, or even desired, in embodiments of the present invention, and that certain of the functionality described with respect to the entities depicted FIG. 1 may be combined into a single entity or eliminated altogether. Additionally, in some embodiments other data sources not shown in FIG. 1 may be utilized. FIG. 1 is therefore exemplary only and should in no way be taken as imposing any limitations on embodiments of the present invention.

Figure 2:
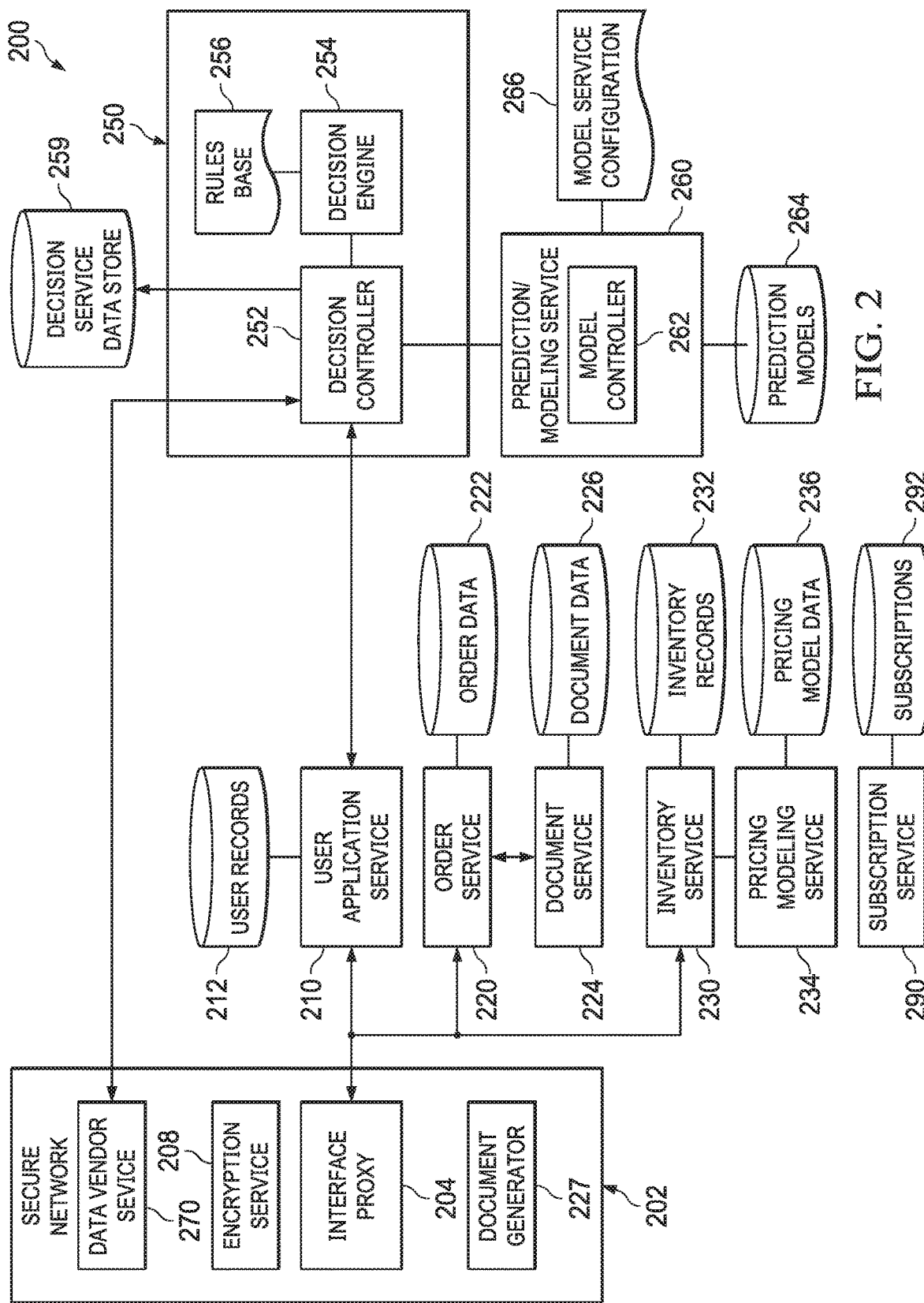
FIG. 2 is a block diagram of one embodiment of a software architecture of an automotive data processing system.

According to one embodiment, various modules discussed above can be implemented as a set of services at one or more servers. FIG. 2 is a block diagram of one embodiment of a software architecture of an automotive data processing system such as automotive data processing system 100. In the illustrated embodiment, the software architecture 200 comprises a number of services (which may be independently executing services) including secure network services 202, a user application service 210, an order service 220, an inventory service 230, a document service 224, a decision service 250, a prediction and modeling service 260, a price modeling service 234, a data vendor service 270 and a subscription service 290. Each of user application service 210, decision service 250, prediction and modeling service 260, price modeling service 234, order service 220, inventory service 230, document service 224, data vendor service 270 and subscription service 290 may also include interfaces, such as APIs or other interface, so that other services can send calls and data to and receive data from that service.

The services may utilize various data stores operable to store obtained data, processed data determined during operation, rules/models that may be applied to obtained data or processed data to generate further processed data and other information used by the services. In the embodiment illustrated user application service 210 stores user application records in user application service store 212, decision service 250 stores data in data store 259, order service 220 stores order data in order service data store 222, document service utilizes data stored in document service data store 226, inventory service 230 stores inventory records in inventory service data store 232, price modeling service 234 uses price model data in data store 236, predication and modeling service 260 and uses prediction models stored in data store 264. The various services may utilize independent data stores such the data store of each service is not accessible by the other services. For example, each of user application service 210, decision service 250, order service 220, inventory service 230, document service 224, price modeling service 234 and prediction and modeling service 260 may have its own associated database.

Secure network services 202 include interfaces to interface with client computing devices and information provider systems 120. The interfaces can be configured to, for example, receive and respond to queries from users at client computing devices, interface with information provider systems 120, obtain data from or provide data obtained, or determined by architecture 200 to client computing devices or information provider systems. It will be understood that the particular interface utilized in a given context may depend on the functionality being implemented, the type of network utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, APIs, libraries or other type of interface which it is desired to utilize in a particular context. Secure network services 202 provide a walled off segment of the system the system. Certain unencrypted information, such as PII, is not available to other components of the software architecture outside of secure network services 202.

In the embodiment illustrated, secure network services 202 include an interface proxy service 204 that receives calls and data from client applications (e.g., client application 114 or web browser accessing a dealer portal) or services of architecture 200, routes calls and data to the services of architecture 200 and routes responses to the client application or calling service as appropriate. Interface proxy service 204 can provide authentication services, assigning unique user IDS to new users, authenticating users when they log back in to automotive data processing system 100 and providing other functionality. Once a user has authenticated, interface proxy service 204 can provide context (such as a user ID) that can be passed with requests to other services.

Secure network services may also include data vendor service 270 configured to communicate with information provider systems 120 to request information from the information provider systems 120. For example, data vendor service 270 may include APIs for services at information provider systems 120, such as 3rd party services, that provide data incorporated in decisions. Data vendor service 270 may include APIs dedicated to each information provider system 120.

Encryption services 208 are provided to internally encrypt/decrypt sensitive information, such as personally identifiable information (PII), and other information received via data vendor service 270 and interface proxy service 204.

At least some data communicated between automotive data processing system 100 and a client computing device may be encrypted beyond encryption generally used to encrypt communications (such as HTTPs). For example, PII provided by a client application (e.g., mobile application 114) may be encrypted according to a first encryption protocol. Interface proxy service 204 may forward the encrypted PII for use by other services, such as user application service 210, which cannot decrypt the information.

Information provider systems 120 may require PII to return information about a consumer (e.g., the API for a credit reporting agency information provider systems 120 may require inputting a name, address, social security number or other PII to receive a credit report). When data vendor service 270 receives encrypted PII from another service to send to an information provider system 120, data vendor service 270 can call encryption service 208 to decrypt the PII from the internal format and then data vendor service 270 can then encrypt the PII in the encryption format used for the API call to information provider system 120. Similarly if PII is received from information provider system 120 via data vendor service 270, data vendor service 270 can decrypt the PII according to the encryption/decryption used by the particular data vendor, call encryption services 208 to encrypt the PII according to the internal format and forward the encrypted PII to another service. Thus, PII is highly secure because, in some embodiments, it is only ever decrypted at secure network services 202 to be re-encrypted for forwarding to other services.

Interface proxy service 204 and data vendor service 270 may thus be configured with rules regarding which PII is to be encrypted by encryption service 208. Examples of information that can be considered PII based on the rules includes, but is not limited to: first name, last name, middle name, date of birth, email address, government id numbers (social security numbers, driver's license number), address, driver's license bar code scan, driver's license image, phone numbers, signature, insurance card information, bank account number, bank account name, bank account balance, employment information or other information. In some embodiments, the rules will specify which fields of data in an input from a client application or response from an information provider system 120 are to be internally encrypted according to the internal encryption format.

User application service 210 is configured to receive user requests to register with the data processing system, manage user applications and communicate with client applications regarding user applications for approval. In particular, user application service 210 can receive requests to apply for financing along with associated consumer data.

According to one embodiment, a request to initiate an application along with registration information (e.g., an email address) is received via an API call to interface proxy service 204 from client application 114. Interface proxy service 204 route the call and consumer data (for example, including the encrypted PII) to user application service 210. User application service 210 creates a user application having a unique application id for the user. User application service 210 returns the application id to client application 114 (via interface proxy service 204) for use in future communication regarding the application.

The user application may be managed as an object that proceeds through multiple states. The user application may be persisted in user application service data store 212 as a user application record, which may be one example of a user record 132. User application service 210 can further receive additional consumer information from client application 114 and enhance the user application record.

In an exemplary embodiment, user application service 210 is configured to receive an API request routed by interface proxy service 204 for an approval decision for a user application. User application service 210 generates a decision request to decision service 250 requesting a preapproval decision and provides the decision input attributes required for a decision. User application service 210 is configured to receive a decision result from decision service 250 and generate a response to client application 114. User application service 210 may also take other specified actions based on the decision result. When a user application is approved, user application 210 may pass context information to order service 220. Such context information may include, for example, consumer PII, user ID, application ID, an affordability score, a credit risk score or other information used by order service 220.

As consumers search and view vehicles, order service 220 maintains order profiles for the users containing order context information. An order profile can contain information about a consumer (consumer context data received from user application service 210) and vehicle context data (data about a vehicle currently being viewed). Order service 220 can receive requests to search or view vehicles, add consumer context to the request and forward the request to inventory service 230 to search inventory records. When a user selects to view a vehicle, order service 220 can maintain a record of the vehicle viewed to allow order service 230 to send requests to document service 224 to generate previews of contracts and other documents.

Order service may manage order profiles that hold information about consumers and any vehicle the consumer has selected view. According to one embodiment, when a user application is approved, order service 220 receives consumer context information from user application service 210 and creates an order profile. Further, when a user selects particular vehicles to view, order service 220 receives the vehicle information from inventory service 230. When a user indicates that he/she wishes to finalize a purchase, inventory service 230 can create an order, which may be managed as an object that proceeds through multiple states and may be persisted in order service data store 222.

Document service 224 is configured to generate previews of documents and final documents. In particular, if a user selects to preview a contract or finalize a contract, the order service 220 forwards context data, including consumer information and vehicle information, to order to document service 224 and requests that document service 224 generate a preview of an order or final documents for the order. Document service data store 226 may include multiple templates, such as templates for different geographic regions and document service 224 may apply template selection rules to the order data to select a template from multiple templates from which generate a document. Using a template of a contract from document service data store 226, document service 224 may generate an HTML, PDF or other version of the contract by populating the template with data from the order service and return the generated contract to the order service 220. The order server 220 can then respond to the user's request to view a preview of the contract or the final contract.

Some of the information provided by order service 220 to document service 224 may be encrypted and thus the populated template may include encrypted data. According to one embodiment secure network services 202 may include a document generator 227. When interface proxy service 204 receives a response to pre-view a document or review a final copy of the document, interface proxy service 204 may send the populated template to document generator 227, which can use encryption service 208 to decrypt the encrypted data and complete the preview or final document using the decrypted data. The completed preview or final document is then returned to client application 114.

Inventory service 230 is configured to ingest and enhance inventory records, filter the inventory records, determine pricing information, publish inventory records to inventory service data store 232 and search inventory records. As part of filtering inventory records and determining pricing, inventory service 230 may use depreciation models generated by price modeling service 234 that correspond to year/make/model/trim and mileage bands. If a depreciation model does not exist for a year/make/model/trim, inventory service 230 can filter out the inventory feed record. If a depreciation model does exist for the year/make/model/trim, inventory service 230 can use the depreciation model to determine payments for a vehicle. A data store 236 may store a pricing model, depreciation models or other data used by price modeling service 234.

Decision controller 252, according to one embodiment, is the main application layer of decision service 250 that routes calls between services and is responsible for logging actions. Decision controller 252 is configured to receive requests for decisions from other services and return decision results. Decision controller may assign a decision request a unique decision identification and return the decision identification to the requesting service. Decision controller 252 may pass a request for a decision along with relevant input data to decision engine 254 and pass the decision result to a requesting service.

Decision engine 254 is a rules-based software system that provides a service that executes decisions on decision inputs in a runtime production environment to generate a decision output. Executing a decision can include applying a set of decision rules to the data to approve/disapprove the action and/or take some responsive action, such as generate an output.

A decision input defines the set of data for which a decision will be made. In automotive data processing system 100, the decision input may be some minimum set of information needed to approve a user and/or a particular transaction, such as the user's name, address, social security number, driver's license number or other information used in the decision process. These values may be encrypted and/or tokenized when passed to decision controller 252. At least a portion of the data to be included in a decision output may be specified by the decision executed.

A decision may have an associated "kind" that indicates the type of decision being implemented. The decision "kind" can be used by other services (e.g., user application service 210) to request a decision or other decisions to reference that decision (to create a tree of decisions). Decision base 256 specifies, for each decision type, rules on how to interpret data to approve/disapprove users or transactions, determine products to offer or make other decisions consistent with regulations, business policy or other constraints. For example, the decision base 256 may specify the approval rules 140 to be applied.

In general, decision engine 254 executes a decision to determine if a set of data meets conditions specified in the decision rules for the decision type and generates an output based on the application of conditions to the data. The data to which the conditions are applied may or may not include the decision inputs. Decisions may reference data sources from defined by decision service 250, predictions from data modeling services and prediction services 260 and sub-decisions and contain rules that are applied to data obtained from information provider systems 120, prediction scores from prediction and modeling service 260, sub-decisions, decision inputs or other data.

If a decision references a prediction, decision engine 254 can generate a prediction request to prediction and modeling service 260. Prediction and modeling service 260 can apply a prediction model to a set of prediction inputs to return a prediction score. A prediction model may be a set of user defined prediction rules or a machine learning model.

According to one embodiment, prediction and modeling service 260 comprises a model controller 262 that receives prediction requests and delegates the request to the correct prediction model 264 based on rules or to a specific model if the specific model is specified with the prediction request. For example, model controller 262 can be configured to delegate a request for an income prediction to a currently active income prediction model if the income prediction request does not specify a particular income prediction model. In this case, prediction and modeling service 260 can process the request using the currently active income prediction model. Modeling service configuration data 266 specifies what models are used and what models are active.

Decisions and prediction models may require data from information provider systems 120. Data vendor service 270 can be used to collect data from information provider systems 120. According to one embodiment, decision service 250 can define and manage data sources, data source versions, data source arguments, and data source records. A data source specifies a set of data from one or more information provider systems 120 (e.g., 3rd party services provided by information provider systems 120) that can be passed to other services. For example, a data source may be a report containing data gathered from one or more information sources 120. The decision service 250 can maintain a definition of the arguments needed to collect the data for an instance of a data source version, receive argument values from other services, collect the data via data vendor service 270 and pass the data source instance to the requesting service or use the data source instance in executing a decision. Decision service 250 may further cache data source instances for faster retrieval in response to a subsequent request for the data source instance.

According to one embodiment, when decision controller 252 receives a request for a decision, decision engine 254 confirms what data is required to retrieve a data source instance from an information provider system 120 to execute the decision prior to executing an API call to data vendor service 270. For example, if decision engine 254 requires "Report A version 1" data source when processing a request to qualify a user, and a social security number is required to fetch that report, decision engine 254 can cross reference the required arguments for fetching said data source with the arguments provided to decision service 250 for the generating the decision and assess whether the dependencies have been met, resulting in a fetching of the data source report, or not, resulting in decision service 250 responding to the user application service 210 with what further arguments are needed. In response to a complete set of arguments, i) decision engine 252 passes the arguments (which may be encrypted or tokenized) to data vendor service 270, ii) data vendor service 270 collects the Report A version 1 instance from an information provider system 120 via the API for system (which may use encryption service 208 to decrypt/encrypt PII) and iii) data vendor service 270 provides the Report A version 1 instance to decision engine 254. Furthermore, decision service 250 may cache the report instance so that it can respond to requests for the report within a specified time window with cached data rather than fetching the data again from the information provider system. In some cases, the decision may specify a 'force' fetch of a data source, such that decision service 250 fetches a fresh report from data vendor service 270 (e.g., from the third party vendor) rather than using a cached report instance.

Similarly, according to one embodiment, when the decision engine 254 receives a request for a decision, the decision engine 254 may not know what data is required to make a prediction required by the decision. The decision engine can call over to the prediction and modeling service 260 and prediction and modeling service 260 informs the decision engine 254 of the data needed for the prediction. For example, if decision engine 254 makes a call to prediction service 260 for an "Income Prediction version 1", the prediction service can inform decision engine 254 of the data sources or other data needed to make the prediction. In response, i) decision engine 254 communicates with data vendor service 270 to collect the data sources as described above; ii) passes the data source instances or other data to the prediction service 260; iii) receives the results of the requested prediction from the prediction service 260.

Any data sources required and the data from the data sources used by particular rules in decision making can be specified in the decision rules in decision base 256 or prediction models 262 stored in modeling service configuration data 262 rather than the decision engine code. From the perspective of decision engine 254, gathering data sources and receiving the results of predictions is simplified as decision engine 254, in some embodiments, need only be able to request a data source instance from and pass arguments to data vendor service 270 to receive a data source instance and request a prediction from and pass arguments to prediction service 260 to receive prediction results from service 260.

Thus, based on the decision type and decision input attributes for the decision that decision engine 254 is being requested to make, decision engine 254 can access the appropriate rules (e.g., from decision base 256), retrieve the required data sources and/or prediction scores, process the decision rules to generate a decision result and return the decision result to the requesting service. The decision result may include the id of the decision and metadata about the decision including, for example, an indication of whether the decision result was a pass or a fail, prediction scores generated when making the decision, decline codes indicating why the decision failed or other decision metadata.

Decision controller 252 returns the decision result to the calling service (e.g., user application service 210). Decision controller 252 may also store data associated with the decision in decision service data store 259 (such as, but not limited to, decision type, decision inputs, model identifier, prediction inputs, prediction scores, data source instances, decision result metadata).

User application service 210 is configured to update the appropriate user application record with the decision result data to update the state of the user application. User application service 210 further includes rules to map decision results to actions. According to one embodiment, if the decision result indicates a pass, user application service 210 can generate a response to the preapproval requesting from client application 114 including data, such as the affordability score, and send the response to the client application 114 via interface proxy service 204. Client application client application 114 can be configured to proceed to a next stage in the purchase process by, for example, displaying an application page corresponding to the next stage on the client computing device 110.

User application service 210 can categorize decline codes as soft and hard declines. Soft decline codes may be mapped to responses to request additional information or provide instructions to the user to take some action, such as call a customer service representative. Based on the soft decline code, user application service 210 can generate the appropriate response and send the response to the client application 114 via interface proxy service 204. Based on the decline response, client application 114 can display the appropriate application page to allow the user to input additional information or provide instructions to the user on how to continue the application stage. In response to receiving the requested additional information from the user, user application service 210 can request that the preapproval decision be reevaluated by decision service 250.

A hard decline, on the other hand, terminates the application stage. User application service 210 may send a hard decline response to client application 114 and client application 114 can display an application page indicating that the user application has been denied and the reasons for the denial. In some cases, user application service 210, responsive to a hard decline code, may send the user application record data to a service configured to report the decline to a credit reporting agency, generate a letters to report the hard decline or take other actions.

Subscription service 290 may receive a payment schedules and financial information from orders, store subscriptions (e.g., in subscription service data store 292) containing the payment schedule and financial information necessary to interact with a consumer's financial institution and interact with financial institutions to execute the payment schedule.

Figure 3:
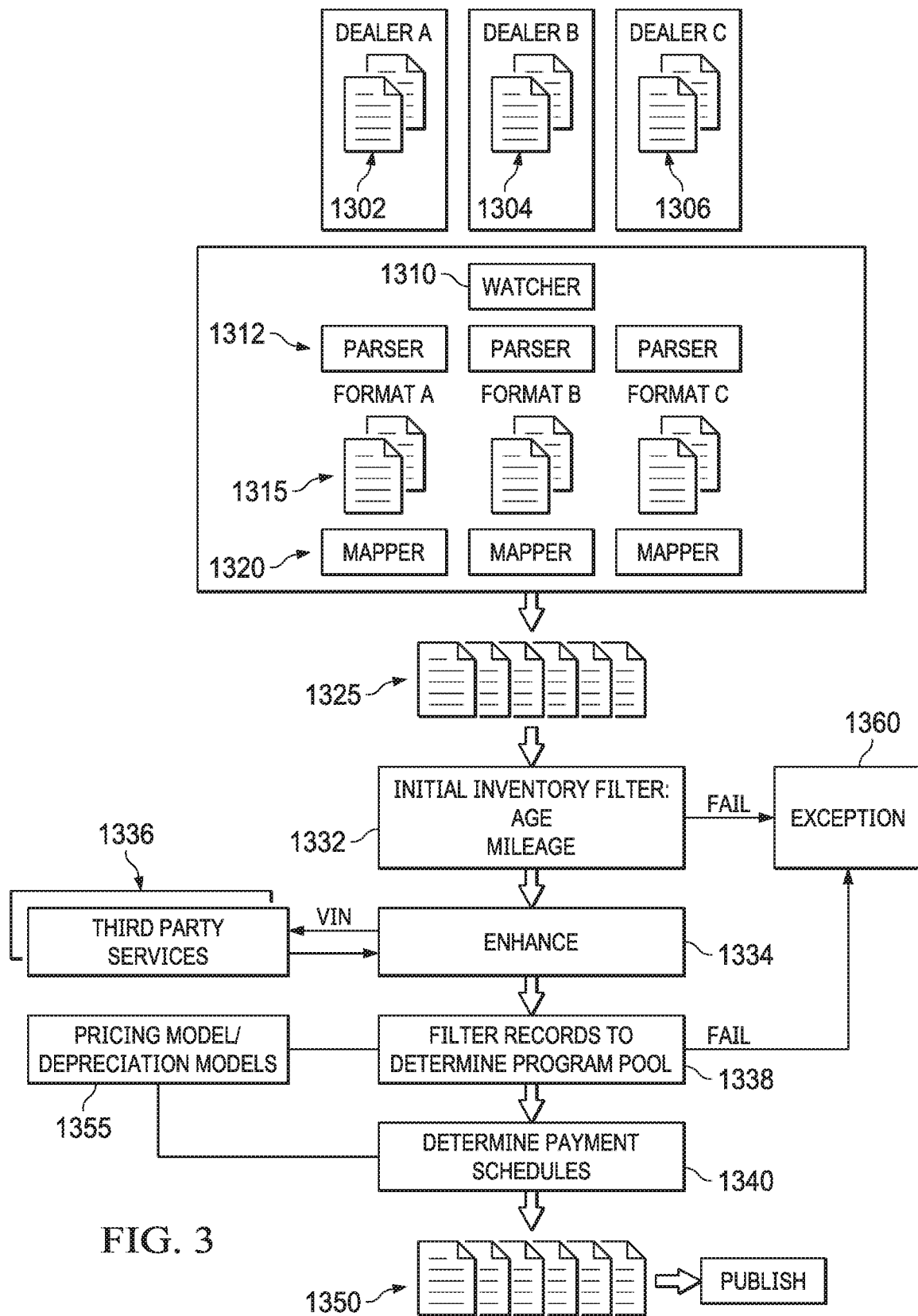
FIG. 3 is a block diagram illustrating one embodiment of inventory processing.

FIG. 3 is a block diagram illustrating one embodiment of inventory processing that may be performed by automotive data processing system 100. More particularly, according to one embodiment, inventory module 164 or inventory service 230 may perform inventory processing.

Automotive data processing system 100 receives inventory feeds from DMS 122, inventory systems 124 or via other channels. For example, automotive data processing system 100 may receive inventory files (such as CSV files) from various dealers uploaded to an FTP site. In other embodiments, automotive data processing system may collect inventory information by making appropriate API calls to a DMS 122 or inventory system 124.

The inventory feeds include inventory data for inventory associated with registered (on boarded) dealers and pricing information. Different dealers or DMS systems, however, may use different data formats. Automotive data processing system 100 can apply rules to extract inventory information from the various feeds and normalize the data into an internal format.

An inventory feed record, which may include information from one or more sources, can include information such as a VIN, segment, manufacturer, model, model year, trim level, engine displacement, drive type, series lifecycle, vehicle condition, geographical region, type of sale, options, color, remaining OEM or CPO warranty coverage, dealer asking price, dealer odometer reading, dealer description of the vehicle. It may be noted that, in some cases, an inventory feed record may only provide a limited amount of information, such as VIN, year/make/model, dealer odometer reading, dealer asking price. As discussed below, the inventory data from an inventory feed may be enhanced with data from other network locations.

Different dealers or DMS systems may use different data formats. Automotive data processing system 100 can apply rules to extract inventory information from the various feeds and normalize the data into an internal format. For each VIN, the automotive data processing system 100 can create a normalized inventory feed record 1350.

In the illustrated example, dealer A uploads inventory files 1302 in a first format to a first FTP site, dealer B provides inventory files 1304 in a second format to a second FTP site and dealer C uploads inventory files 1306 in a third format to a third FTP site. According to one embodiment automotive data processing system 100 can comprise a watcher process 1310 that watches for new inventory feed events, such as a file being uploaded to an FTP site, and initiates a processing job to process the inventory feed records. Thus, processing jobs can begin as soon as an inventory file is uploaded.

Based on watcher 1310 determining that a new inventory file has been uploaded or an inventory feed otherwise received, vehicle data application 150 can read and process the feed. According to one embodiment, vehicle data application 150 can be configured to parse the CSV files (or other input data) to extract inventory feed records for individual vehicles. Therefore, vehicle data application 150 may include parsers 1312 dedicated to each input format and configured to parse out individual inventory feed records 1315 from inventory files. Moreover, vehicle data application 150 can include format mapping modules 1320 configured to map extracted inventory feed records from different dealer formats into inventory records in a normalized internal format. For example, each mapping module may be configured to extract delimited data from CSV records and map the delimited data to normalized fields to create normalized inventory feed records 1325.

Vehicle data application 150 may apply initial inventory filter rules 1332. Initial inventory filter rules 1332 may include rules to filter out records based on a variety of factors. An initial set of filters may filter out inventory records with incomplete or duplicative data or based on other criteria. For example, rules may be applied to filter out vehicles for which the asking price is above a particular maximum price, vehicles outside of particular geographic regions, new vehicles or based on other criteria.

In particular, one or more inventory rules 144 may be applied to create a program pool of inventory items for which competitive payments that account for deprecation can be accurately established. The inventory rules may include a set of "fair value" filters configured to ensure that for each vehicle in the program pool i) there is sufficiently reliable residual value data for the vehicle for the expected life of an ownership agreement, plus a reasonable margin of error; ii) the vehicle is priced at a point that reasonably reflects fair market value and allows a payment schedule to be established that is competitive; iii) the vehicle remains affordable to the consumer through the predicted life of an ownership agreement; iv) the vehicle is fairly priced to the consumer such that all customers are protected against buying a car that is objectively overpriced. While, as discussed above, some tools help the consumer in negotiation, automotive data processing system 100 can eliminate negotiation by pre-determining fair payment schedules for vehicles before a consumer looks at the vehicles.

In general, the cost of ownership of a vehicle becomes more difficult to predict as a car increases in mileage because the frequency of higher dollar scheduled maintenance requirements and the frequency and severity of repairs increases with higher mileage vehicles, and the amount of secondary market data utilized for residual value estimation decreases. When aggregate MR (maintenance, repair) expenses are analyzed, the cumulative MR expense during the OEM warranty period is low and generally linear (consisting of mainly oil changes and other lower dollar preventative maintenance), but after the vehicle exits the warranty period, the MR expenses increase at an increasing rate due to the increasing frequency and severity of MR occurrences. Therefore, both the maintenance and repair expenses and depreciation become harder to predict for vehicles at higher mileages. The mileage at which cost-of-ownership tends to ramp up may depends on vehicle or other factors.

It can be noted, however, that other age caps may be used depending on the availability of reliable wholesale data or residual value data or the ability to model residual value data for older vehicles. Moreover, different age caps may be set for different vehicles depending on, for example, the reliability of the vehicle year/make/model, remaining warranty or other factors.

Rules may be established to filter out vehicles based on model years. Residual value data becomes less reliable for predicting the actual residual value for a vehicle in the future the older the vehicle is. As such, an age limit for vehicles entering the program pool can be set to limit the number of vehicles over a certain age that will be under ownership agreements. For example, it may be desirable to limit the number of vehicles over 7 model years old that will be under ownership agreements (e.g., because it has been determined that residual value data is less reliable for older vehicles) and the predicted average life of ownership agreements is 18 months, a filter rule can be established to filter out vehicles of greater than 4 model years old. In this example, 4 years can be selected because the expected average hold time for vehicles is 18 months with the further expectation that only a very small percentage of consumers will hold vehicles for more than 36 months. This means that most ownership agreements will terminate before the subject vehicles are more than 7 model years old.

Thus rule can be established to filter out vehicles of greater than 4 model years old or other age limit. As another example, a filtering rule may filter out vehicles based on a maximum mileage threshold, for example, 30,000, 50,000 or other mileage. Different age and mileage caps may be set for different vehicles depending on, for example, the reliability of the vehicle year/make/model, remaining warranty or other factors.

Furthermore, age can act as a proxy for mileage. In general, the frequency of higher dollar scheduled maintenance requirements and the frequency and severity of repairs increases with mileage. When aggregate MR expenses are analyzed, the cumulative MR expense during the OEM warranty period is low and linear (mainly oil changes), but after the vehicle exits the warranty period, the MR expense increases and also starts to bend upward due to the increasing frequency and repairs of MR occurrences. Vehicles that are under 7 years old are more likely to remain under the mileage at which cost-of-ownership tends to ramp up.

Rules may be established to filter out vehicles based on mileage. For reasons discussed above, it may desirable to limit the maximum mileage of cars presented by automotive data processing system 100. For example, the maximum mileage can be set to 30,000, 50,000 or other mileage. Again, this can help prevent vehicles subject to ownership agreements from reaching extreme mileage during the life of the ownership agreements. It can be noted, however, that other mileage caps may be used depending on the availability of reliable wholesale data or residual value data or the ability to model residual value data for higher-mileage vehicles. Different mileage caps may be set for different vehicles depending on, for example, the reliability of the vehicle year/make/model, remaining warranty or other factors.

For inventory feed records that are not filtered out at step 1332, automotive data system 100 can create an inventory record for the respective vehicle (VIN) or, if an inventory record for the VIN exists in system 100 already, update the inventory record for the vehicle.

At 1334, the automotive data processing system 100 interfaces with one or more distributed information provider systems 120 to enhance the inventory record. For example, automotive data processing system 100 may use APIs to collect relevant data from a number of third party services 1336. Note that each API call may be associated with a staleness check. A particular set of enhanced inventory data is not collected again for a vehicle unless the data is considered stale. When enhanced inventory data is collected for a VIN, the inventory record for a VIN may be updated with the date at which data was collected from the particular service 1336.

According to one embodiment, automotive data system 100 can send a VIN (and some cases additional data) to one or more automotive description service information provider systems 120, receive information associated with each VIN in response and enhance the inventory record for the VIN based on the received information. For each VIN in an inventory feed, automotive data processing system 100 can check when description service data from the automotive description service information provider was last checked (if ever) for that VIN and if the information for that VIN is not stale (e.g., was checked within the last x days by automotive data processing system 100), request the description information from the automotive description service. Automotive description services can provide information such as year, make, model, trim, style, color, technical specifications, standard equipment, installed options for a VIN, stock images for the make/model/trim and other information. One example of an automotive description service is the ChromeData service provided by Autodata, Inc. of Portland, Oreg.

Automotive data processing system 100 can further enhance an inventory record with vehicle history data. According to one embodiment, automotive data processing system 100 may obtain vehicle history reports from a vehicle history information system (which can be an example of an information provider system 120). For example, Carfax, Inc. of Centreville, Va. provides a vehicle history reporting service. As another example, Experian provides the Autocheck vehicle history report service. For each VIN in an inventory feed, automotive data processing system 100 can check when vehicle history data from the vehicle history reporting service was last checked (if ever) for that VIN and if the information for that VIN is not stale (e.g., was checked within the last y days by automotive data processing system 100), request the vehicle history information system.

Automotive data processing system 100 can further enhance a vehicle inventory record with a current value. For example, various third party information provider systems 120 provide trim matching services that provide a current wholesale value based on year/make/model/trim and odometer reading. For example, Manheim Auctions, Inc. of Atlanta, Ga. ("Manheim") provides current wholesale values for vehicles based on year/make/model/trim and odometer (known in the industry as the Manheim Market Report (MMR)). Manheim can also provide historical wholesale values (2 weeks ago, 4 weeks ago, 2 months ago, 6 months ago, etc.) Similarly, Kelley Blue Book of Irvine, Calif.

provides current wholesale values for vehicles. Automotive data processing system 100 can check when wholesale value data from the wholesale pricing system was last checked (if ever) for that VIN and odometer reading and if the information for that VIN and odometer reading is not stale (e.g., was checked within the last z days by automotive data processing system 100), request the wholesale pricing information for that vehicle using, for example, the VIN and current odometer reading from the inventory record.

Based on the enhanced inventory records, automotive data processing system 100 can further filter vehicles to determine vehicles in the program pool. Examples of additional fair value filters that can be applied include, by way of example:

Model/trim: A wholesale pricing system may not have a current value for a particular year/make/model/trim. Vehicles for which the wholesale pricing system does not return a current value can be filtered out. Furthermore, automotive data processing system 100 can filter out a vehicle if there is insufficient data to match the vehicle to a pre-determined residual value model.

Vehicle history: Vehicles may be filtered based on vehicle history. Rules can be applied to the vehicle history information to exclude vehicles. Rules may be established to exclude vehicles based on, for example, accidents, airbag deployment, structural damage, branded title or other title marks, odometer info or other items.

Price: In some embodiments, vehicles can be filtered based on price. The intermediary may only wish to offer vehicles that are priced near fair market value at sale. As such, rules may be established to filter out vehicles that, according to the rules, are over-priced. Price filtering may be based, for example, on wholesale value. In one embodiment, for example, automotive data processing system may filter out vehicles that exceed the wholesale value for the vehicle configuration (e.g., make/model/year/options/mileage, etc.) by a specified dollar or percentage cap.

A rule can be established such the vehicles must be priced within a set % cap (e.g., 110-120% or other percentage) or dollar value of a trusted price index such as "above [average condition] MMR" price or other wholesale values indicated for the vehicle configuration ("above MMR" is a metric known in the industry that considers vehicle condition in the valuations). The price filter helps ensure that each vehicle is priced close to the residual value model (or other model) for that vehicle at the beginning and that consumers are not overpaying for vehicles. In addition, a price filter may be applied to filter out vehicles that are priced too low compared to a trusted index.

In another embodiment, the vehicle year/make/model/trim, odometer reading can be input into a pricing model (discussed below) to determine a current value (0 term) based on the pricing model to determine a model-based current value. Rules can be implemented to filter out vehicles that are not within thresholds (percentage or dollar value) of the model-based current price.

In accordance with one embodiment, records that do not meet the filter criteria applied at 1332 and 1338 can be added to a queue of exceptions 1360. These exceptions may be made available to a dealer so that the dealer understands why a vehicle failed to be placed in the program pool. For example, vehicles offered by a dealer that exceed the price limit set for the price filter but otherwise pass the filtering rules (the "price excluded set") can be displayed to dealer in the dealer portal. The maximum price allowed by the price filter may also be displayed for each vehicle. The dealer can see their price and the maximum price allowed by the filter for each vehicle and may be given the option to "Set Price To Max" to set the price on any particular vehicle or their entire price excluded set to the corresponding maximum price. Vehicles set at maximum filter price can be included in the next update.

A number of the above-referenced filters may be applied to pre-filter inventory before accepting the inventory into the system or before displaying an inventory item to a consumer. Additional filters may also be applied to post-filter inventory records after inventory records have entered the system. For example, in one embodiment, automotive data processing system 100 may obtain a more detailed vehicle history report when a user selects a particular vehicle and filter the vehicle based on the additional vehicle history report information. In one embodiment, automotive data processing system may obtain additional vehicle history report information from the Autocheck service and apply rules to remove a vehicle based on one or more of title issues, deployed airbag, major accident, auction notes, exterior/weather/fire/water damage, theft, repossession or other items.

According to one embodiment then, the inventory records stored by automotive data processing system 100 can include inventory records that passed the pre-filters and have not been eliminated by a post-filter and inventory records that passed all the pre-filters except price and have not been eliminated by a post-filter.

At 1340, automotive data processing system 100 is configured to apply payment models/depreciation models 1355 to determine initial and monthly payments for vehicles in a program pool where the payments are selected to achieve desired metrics. In accordance with one embodiment, the payments may be selected to allow the user to return a vehicle at any time while still being viable for the intermediary. The initial payment and monthly payment can be determined in a manner that does not require any information about a consumer. Consequently, these values can be pre-determined for vehicles before the vehicles are presented to a consumer and can be used by automotive data processing system 100 to pre-populate ownership agreements or other documents. An inventory record 1350 can thus be enhanced with one or more payment schedules for a vehicle.

Automotive data processing system 100 can be configured with a plurality of mileage bands (e.g., 0-10,000 mi/yr, 10,001-12,500 mi/yr . . . ) so that when a user selects a vehicle to purchase, the user may select an expected mileage band (how many miles a year the user expects to drive the vehicle). A payment schedule can be determined for each mileage band and stored in the inventory record 1350.

Moreover, automotive data processing system 100 may categorize users into credit risk bands, for example:

If FICO 700-710 then credit_risk=19
IF FICO 711-720 then credit_risk=18
IF FICO 721-730 then credit_risk=17
IF FICO 731-740 then credit_risk=16
\* \* \*
IF FICO 890-900 then credit_risk=0

A payment schedule can be determined for based on each combination of credit risk/mileage band and stored in the appropriate inventory record 1350. In other embodiments, a single payment schedule is determined, the single payment schedule corresponding to a default mileage band (e.g., 10,000 mi/yr) or default combination of credit risk and mileage band.

Filters can be reapplied or payment schedules determined again responsive to underlying data changes. For example, if the inventory record odometer reading for a vehicle changes, automotive data system 100 can re-determine the current price for the vehicle and reapply the various filters to determine if the vehicle still qualifies to be in the program pool. As another example, automotive data processing system 100 may periodically recheck third party services 1336 for data changes, such as changes to the wholesale value.

At step 1352, the automotive data system 100 can publish an inventory record for a vehicle to a front-end. Publication may include copying the inventory record to a different data repository that is accessible by a front-end system. The inventory record, when published, can include base start fees and monthly payments for multiple credit risk bands and mileage bands.

Figure 4:
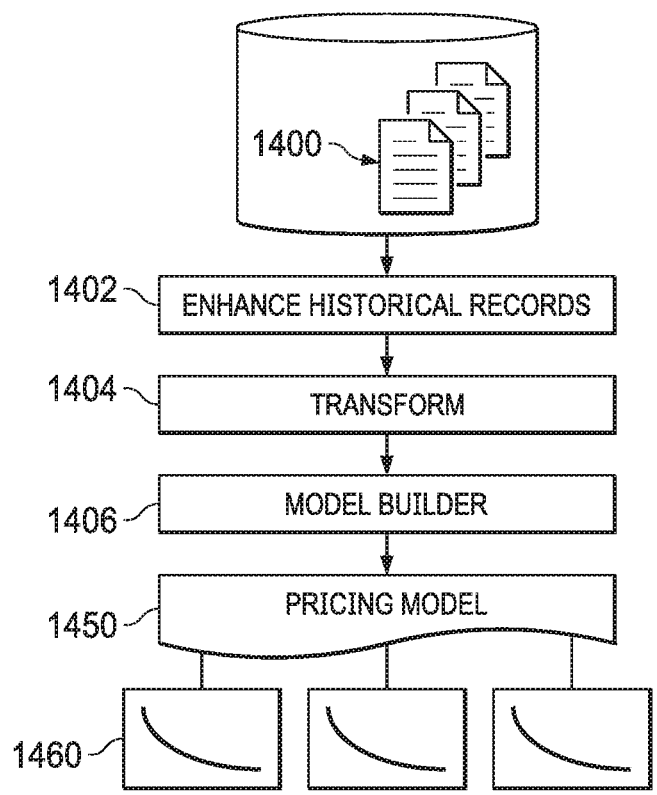
FIG. 4 is a block diagram of one embodiment of a process for developing a pricing model and depreciation curves.

FIG. 4 is a block diagram of one embodiment of a process for developing a pricing model and depreciation curves. The determination of payment schedules may rely on a pricing model 1450 (a residual value model) that can be used to predict secondary market depreciation rates, on a unit level, based on select model specific, usage, industry, and macroeconomic variables, examples of which are provided below. Through machine learning and training, the particular variables of interest (including potentially different or additional variables) and weights can be determined.

According to one embodiment, model 1450 may be a regression coefficient model. The dependent variable of model 1450, may be a year/make/model/trim expected secondary market sale price at a target duration and mileage band (for example, expressed as a percentage of current market value). Examples of independent variables include, but are not limited to: i) vehicle variables-segment, make, model, model year, trim, engine displacement, drive type, series life cycle, vehicle condition, geographic region, type of sale, options, color, remaining OEM or CPO warranty coverage; ii) usage variables-annual mileage, disposal, sales month, months in service; iii) industry variables-new vehicle registrations, fleet penetration, rental penetration; iv) macroeconomic variables-GDP, unemployment, interest rates, secondary market seasonality, household disposable income, fuel prices, CPI, Mannheim Used Vehicle Value Index by Mannheim.

Model 1450 can be trained on a set of historical data 1400. According to one embodiment, historical auction transaction data may be used. The auction transaction data is non-aggregated data that includes information regarding the date, year, make, model, trim, mileage, sales price and other information for individual vehicles sold at auction. For example, a residual value model may be trained using auction data from the National Automobile Dealers Association (NADA) of Tysons, Va. In some cases, the auction transaction data can be enhanced with data from other sources (1402).

The historical data may be transformed (1404) into a form that can be ingested by a model builder 1406. For example, text data may be mapped to numerical data and other transformations applied. The historical data may be input into a model builder, such as the open source scikit-learn (sklearn) tool to generate a pricing model 1450.

The pricing model can be periodically retrained on new data from a third party provider or internal data collected by automotive data processing system 100 over time. As such, the residual value determination may thus become increasingly accurate with additional data and adjust to changing trends.

The residual value model may contextualize data analysis. For example, one piece of information (or combination thereof) may be analyzed differently depending on the results of analyzing another piece of information (or combination thereof).

As described above, the dependent variable may be a year/make/model/trim expected secondary market sale price at a target duration (1 month, two month, etc.) and mileage band (estimate for vehicle driven an average of 10,000 a year, 12,500 miles a year, etc.). Thus, the model can be used to develop depreciation models 1460. Each depreciation model may correspond to a year/make/model/trim and mileage band. For example, the system may generate a depreciation curve (a depreciation model) for a default mileage band (say 10,000 miles-a-year) and excess mileage may addressed by contractual terms (excess mileage fees). In other embodiments, vehicle data application 150 determines the depreciation curves for each mileage band supported. For example, for a specific year/make/model/trim, vehicle data application 150 can determine a 10,000 mile-a-year depreciation curve, a 12,500 mile-per-year curve, etc., up to a maximum mileage band supported by the system 100.

Depreciation curves are not generated for vehicle configurations (year/make/model/trim) for which there was insufficient data input to build the model 1450 (e.g., less than a certain number of records in historical data 1400 or based on other metric). As discussed above, if a depreciation curve is not available for a year/make/model/trim in an inventory record, the inventory record can be filtered out (step 1338).

The pricing model parameters and depreciation models 1460 (e.g., the curve coefficients, intercepts or other data defining the depreciation curves) may be stored. It can be noted that, in many cases, depreciation for a year/make/model/trim/average usage is often linear (a steady percentage), at least while a vehicle is less than a particular age and mileage (usually about 7 years and 100,000 miles) and the inventory filter rules can be selected so that the vehicles in the program pool are in and likely to stay in the region in which depreciation ratio is linear. Thus, the depreciation model 1460 for a year/make/model/trim and mileage band may be a simple percentage in some embodiments.

The residual value model 1450 can be periodically retrained on new data from a third party provider or internal data collected by automotive data processing system 100 over time. As such, the residual value determination may thus become increasingly accurate with additional data. The residual value model may contextualize data analysis. For example, one piece of information (or combination thereof) may be analyzed differently depending on the results of analyzing another piece of information (or combination thereof).

A payment schedule for a vehicle may be determined in a variety of manners. According to one embodiment, the payment schedule is selected so that the combination of start fee and monthly payments stay ahead of the depreciation curve for the vehicle. The payment schedule may also be selected based on other considerations.

Figure 5:
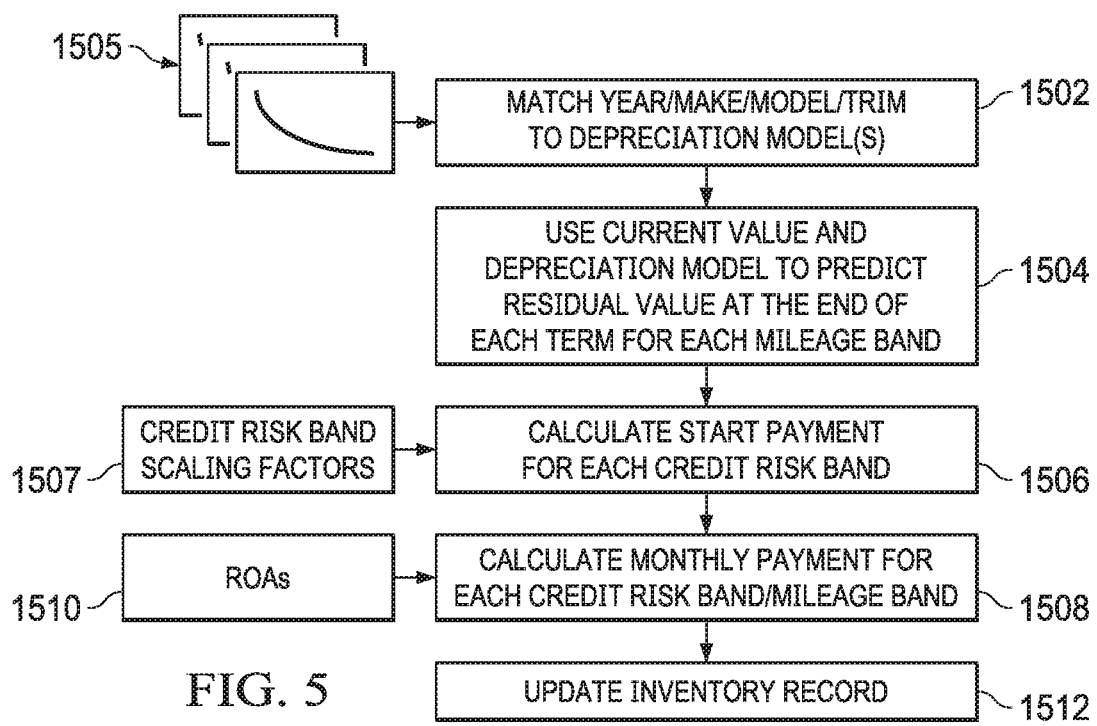
FIG. 5 is a flow chart illustrating one embodiment of determining payment schedules for a vehicle.

FIG. 5 is a flow chart illustrating one embodiment of determining base payment schedules for a vehicle. In the embodiment of FIG. 5, the payment schedule for a vehicle is determined on a unit economics model based on particular metrics, discussed below. At step 1502, the year/make/model/trim is determined and the appropriate depreciation model(s) 1505 loaded (for example one or more depreciation models 1460 developed from the machine learning pricing model 1450). At step 1504, a depreciation model is applied to the current value of the vehicle to determine the predicted value of the vehicle at the end of each term out to a configured term (e.g., the value at the end of month 1, month 2, month 3 etc. to say 72 months or other maximum term). The estimated residual values for each term can be determined for each mileage band. In one embodiment, the current value is the MMR value for the VIN or other trusted index value of wholesale value. In another embodiment, the current value may be determined from a machine learning model, such as pricing model 1450 (e.g., using 0 term).

The data processing system determines one or more base start fees for the vehicle. For example, the base start fee may be 5% (or other percentage) of the dealer's asking price for the vehicle. The base start fee may be adjusted up or down based on credit risk band. According to one embodiment, credit scores may be categorized into credit risk bands and each credit risk band assigned a scaling factor. As such, at 1506, the data processing system may load a set of scaling factors 1507 for credit risk bands. For example, a first credit risk band corresponding to riskier credit scores, may be assigned a factor of 2, high credit scores (an example of a second credit risk band) may be assigned a factor of 0.5 and credit risk bands in between may be assigned factors between 0.2 and 2. In this example, automotive data processing system 100 determines a range of start fees (one for each credit risk band) from 1% of dealer asking price to 10% of dealer asking price. In another embodiment the base start fee is determined along with the monthly payments (step 1508) as a simple multiple of the monthly payments.

At 1508, automotive data processing system 100 determines the base monthly payments for the vehicle. The base monthly payments for the vehicle are determined based metrics. According to one embodiment, return-on-asset (ROA) hurdles 1510 can be set for various terms (e.g., 6 months, 12 months, 18 months, etc.). Moreover, different ROA hurdles can be set for different credit risk bands. For example, the 6, 12 and 18 month ROA hurdles for a higher credit risk band may be higher than the 6, 12 and 18 month ROA hurdles for a lower credit risk band. According to another embodiment, the same ROA hurdles are used regardless of credit risk band. The base monthly payments and/or start fee can be adjusted such that the start fee and monthly payments achieve an ROA hurdle or set of ROA hurdles. For example, the system can start at a default monthly payment amount, say $0, and add a $1 until all the ROA hurdles are met.

The ROA calculation can be performed according to methods known or developed in the art with actual or assumed cost of funds. According to one embodiment, the ROA for a term "t" can be calculated as follows:

$$ROA_{term} = \frac{\sum_{t=1}^{t=term} \text{returns}_t}{\sum_{t=1}^{t=term} \text{asset value}_t}$$

The foregoing is based on the following monthly balance sheet items for the particular vehicle for each month:
1) asset value: predicted value of asset at term t as predicted from the residual value prediction models (e.g., depreciation models).
2) returns: expected cash flows associated with the vehicle (net income on the vehicle). The cash outflows can include direct costs associated with the particular vehicle items. The cash outflow may include items such as the cost of money, payments made by the intermediary to finance the vehicle or other cash outflows specific to the vehicle. The cash outflow each month may include an amount that models or predicts the risk that the user will default in that month. For example, if it is predicted that there is 0.1% chance that a vehicle will be reposed in any given month and the cost of a repossession is $1000, then a cash outflow can include a $1 fee for the month. Other predicted losses may be included in the cash outflows. In some cases, there are direct costs that are passed directly to the consumer, such as dealer doc fees and other fees. Such costs may be included in the model, but may be ignored as they will have a directly corresponding and equal cash inflow.

In the first month, the cash inflow from the base start fee, the first monthly payment and the cash outflow from the payment to the dealer and other costs associated with the purchase can be represented. Each month can include the monthly payment for vehicle. Moreover, for any given return month, it can be assumed that the vehicle will be sold for the predicted residual value and the monthly cash flow for a term can include the cash flow for the hypothetical sale of the vehicle at that term (e.g., $ROA_6$ can assume the vehicle is returned and sold in month six). The predicted residual value can be calculated by applying the depreciation model to the current value determined for the vehicle.

For example, automotive data processing system may be configured with ROA hurdles as follows: 6 months 0%, 12 months 0.5%, 18 months 1% (the values are provided by way of example). The base monthly payments can be adjusted until the payments yield $ROA_6 >= 0$, $ROA_{12} >= 0.5$, $ROA_{18} >= 1$. As discussed above, the ROA hurdles may depend on credit risk band.

As discussed above, the ROA goals may vary based on credit risk band. As such vehicle data application 150 can determine a fee schedule for each credit risk band. Moreover, as will be appreciated, the predicted residual value for a vehicle at a given term will depend on expected depreciation, which, in turn, depends on expected usage (mileage band). According to one embodiment then, vehicle data application 150 determines the payments to reach the ROA goals for each credit risk band/mileage band combination. For a credit risk band and mileage band, if the ROA determination for a term results in an ROA of less than the ROA hurdle for that term, the monthly payments (or start fee) can be increased until the ROA at that term is at least meets the ROA hurdle. This process can be repeated until the monthly payment schedule meets all of the ROA hurdles. The payment schedule that meets all the ROA hurdles for each credit risk band/mileage band combination may be stored in the inventory record for the VIN.

In addition or in the alternative, an "expected ROA" can be predicted for a given payment schedule. The expected ROA can be determined by multiplying the probability that a consumer will return a car in any given term by the predicted ROA for that term (for a vehicle, mileage band and credit risk band) and summing the results, e.g., $$ROA_{expected} = \sum_{t=1}^{final} (ROA_t * Prob_t)$$

where final can be a configurable number to account for the fact, that at some point, the probability of returns occurring becomes insignificantly small.

The $Prob_t$ represents the probability of a consumer returning a vehicle in a given month of the ownership agreement and may be based on a probability distribution that represents the probability that a consumer will return a vehicle in a given month. In one embodiment, for example, if it is believed that the mean hold time for vehicles will be 18 months and that returns will generally follow a Poisson distribution, automotive data processing system can determine $Prob_t$ for each month according to a Poisson distribution. It can be noted that the Poisson distribution is provided by way of example and other distributions may be used. The probability distribution may be selected based on business rules or according to a model trained over returns data collected by automotive data processing system 100. As the system gains actual customer data on return timing, more accurate predictive models can be built concurrently to model projected vehicle return timing. A payment schedule may be determined so that the $ROA_{expected}$ meets particular ROA hurdles.

At step 1512, automotive data processing system 100 can update the inventory record with the base start fee(s) and monthly payments. For example, if there are 20 credit risk bands and 10 mileage bands defined, the automotive data processing system 100 can determine 20 adjusted base start fees (step 1506) and 200 monthly payment schedules (step 1508) and store the start fees and monthly payment schedules in the inventory record for the vehicle.

The base monthly payments may be adjusted to account for other factors. In some cases, the intermediary may add additional goods and services. For example, it may be desirable to include insurance, a maintenance contract or warranty with each vehicle. The prices for these products may be predetermined for a year/make/model/trim and mileage. Thus, in some embodiments, the vehicle data application 150 may look up the cost of included add-ons (or request the cost from a third party information provider system 120) and add the cost of the required add-on (e.g., maintenance contract, warranty or other items) to the base monthly payment. Thus, the monthly payments stored in the inventory record may be adjusted to include payments for required add-on products. In other embodiments, the base monthly payments and payments for the required add-ons are maintained separately, but combined before being surfaced to the user and for purposes of searching inventory that meets an affordability score.

According to one embodiment, a user may search and purchase inventory items (e.g., vehicles) via data processing system 100. A portion of the data needed to populate an ownership agreement may be determined by data processing system 100 relatively early in the purchase process. For example, the price, base initial payment or base monthly payments for a vehicle are known when the consumer selects a vehicle of interest. Items such as the consumer name, dealer name, VIN number, vehicle description, initial payment, monthly payment and other information may be pre-populated in the ownership agreement and other documents (e.g., maintenance contracts, disclosures) by data processing system 100. Accordingly, the consumer may, in some embodiments, view an initial or final copy of the ownership agreement before going to the dealership.

Some items included in the ownership agreement or other documents, such as options and F&I products, may be selected by the dealer via the dealer portal or consumer via client application 114 and can be added to the documents when the selections are made. In some cases, F&I products can be offered by the intermediary to the customer directly through the application, wherein certain key products will be added by default (like a warranty/service contract) while others can be opt-in.

In addition, some items in the ownership agreement may have to be verified by the dealer or consumer at the time of sale. As a particular example, an inventory record for a vehicle being purchased may only have an estimate of mileage or have the mileage from when the vehicle arrived at the dealership but not the actual mileage at time of sale, which may include mileage from test drives, etc. after the vehicle arrived at the dealer. The dealer may, therefore, have to update the mileage for the vehicle at the time of sale.

The ownership agreement or other documents may be updated as new information becomes available (e.g., such as the consumer selecting F&I products), the dealer verifies mileage, or the purchase process progresses. For example, if the user decides not to purchase a particular vehicle, but indicates through client application 114 interest in a different vehicle at the same dealership, the data processing system 100 can populate the ownership agreement or other documents with the information for the new vehicle of interest.

The documents, in some embodiments, may be associated by data processing system 100 with the user profile of the consumer so that the documents can be accessed by the consumer or dealer through their association with the consumer profile. In some embodiments, an activation code, discussed below, may act as a link to a set of documents associated with the consumer.

It can be noted that, in some embodiments, data processing system 100 can provide the consumer with access to electronic copies of all the documents that are required for a purchase. If the consumer is presented with other documents by the dealer, the consumer will be alerted to the fact that the transaction requires heightened scrutiny.

From the consumer perspective, steps of the purchase process including, for example, searching inventory, selecting a vehicle of interest, reviewing documents and executing documents (with potentially some documents that must be executed by hand) can all be done through a mobile device interface (e.g., as provided by client application 114).

Furthermore, unlike traditional systems in which there is no or little communication between client computer systems and the dealer systems, the client computing devices 110 can, in some embodiments, communicate with the dealer portal through, for example, API services provided by data processing system 100. The consumer can, for example, accept or reject the ownership agreement or portions thereof through his or her mobile device. The documents can be dynamically updated based on interactions by the dealer and consumer.

As a transaction progresses, information associated with the transaction may be pushed to the client application 114 and dealer portal. For example, information about a vehicle, pictures of the vehicle, add-ons plus the price of each item to be purchased can be pushed to client application 114 (e.g., in an "order review" interface) so that the consumer can approve/reject particular items (or the transaction) via the client application 114. Changes to a purchase through the dealer portal or client application 114 (e.g., such as adding or rejecting add-ons) can be synchronized by data processing system 100. Thus, there may be back-and-forth communication between client application 114 and the dealer portal as the purchase order evolves.

Figure 6:
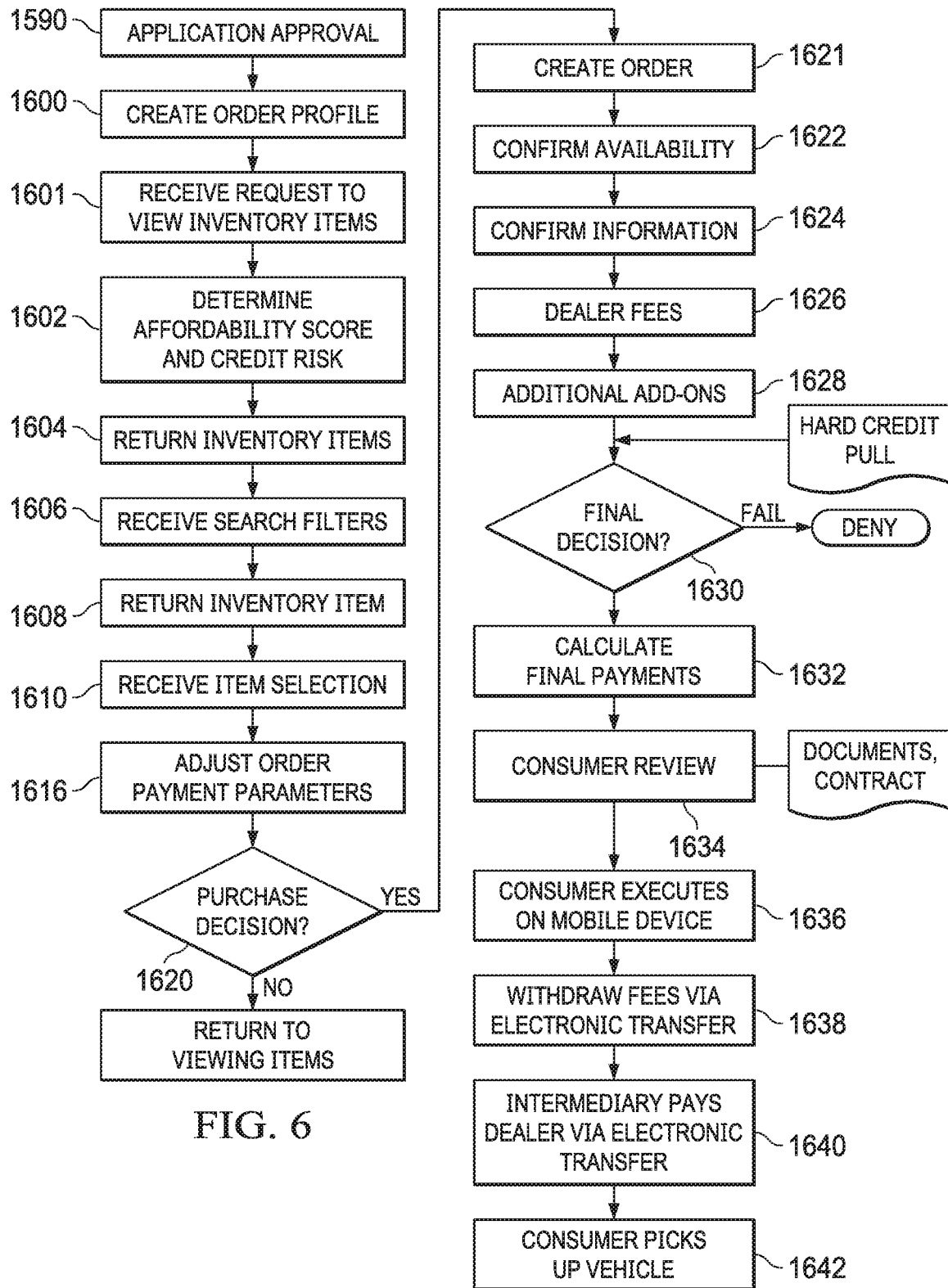
FIG. 6 is a flow chart illustrating one embodiment of performing a transaction.
Figure 7A:
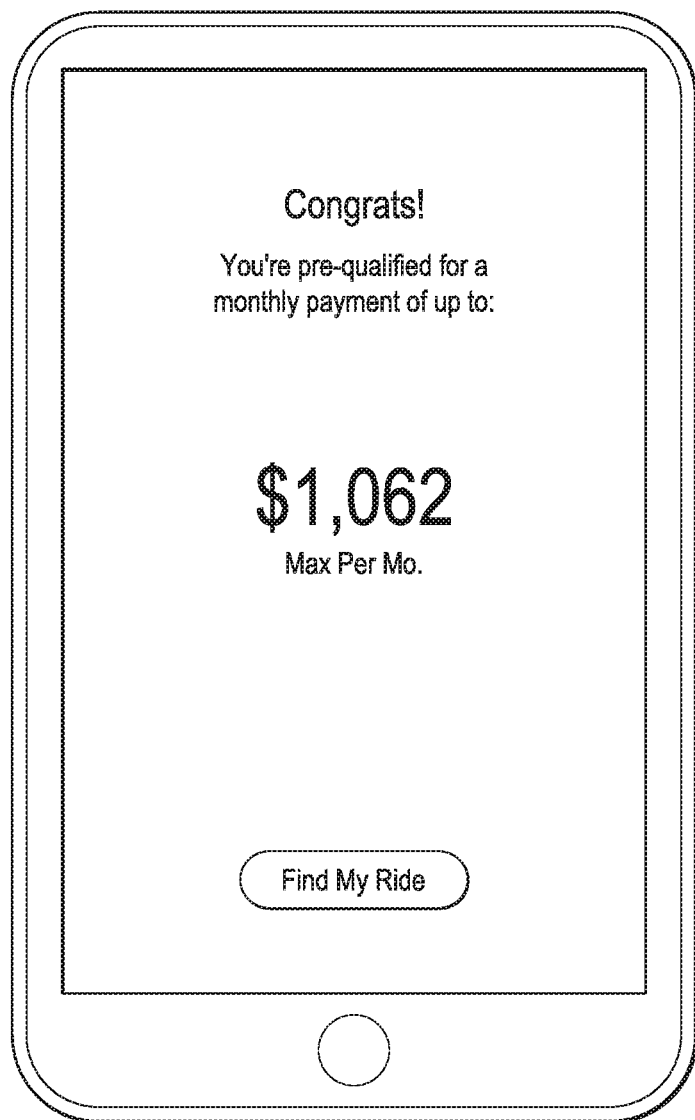

With reference to FIG. 6, one embodiment of a method for performing a purchase process via a data processing system, such as an automotive data processing system 100, is illustrated. FIGS. 7A-7U illustrate examples of application pages at a mobile application and a dealer portal for providing and receiving information associated with a transaction. At step 1590, a user application is pre-approved.

Approval of the application may include applying approval rules 140 to information provided by the user or gathered from third party information provider systems 120. Based on the approval rules, the user may be assigned an affordability score representing the monthly payment (or other periodic payment) for which the user is approved (e.g., the periodic payment an intermediary approves for the consumer). The user may also be assigned to a credit risk score based on FICO or other credit reporting data for the user.

The data processing system creates an order profile when a user application is approved to track the purchase process after pre-approval (step 1600). In one embodiment user application service 210 notifies order service 220 that an application has been approved and passes consumer context information (application data) to order service 220. Order service 220 creates the order profile associated with the user to associate customer information with inventory item information and track context of an approved user's interactions with vehicle data application 150. The order profile may include a variety of attributes, including encrypted PII, the consumer's affordability score and credit risk score and other information. As a consumer browses inventory and selects inventory items (e.g., vehicles), information from the inventory record and other information regarding the selected inventory item may be added to the order profile.

At step 1601, the data processing system can receive a request from a consumer to view inventory items (e.g., based on a user interaction in a GUI, such as by selecting the "Find My Ride" virtual button in FIG. 7A). The data processing system searches its program pool for eligible inventory items based on affordability score. The data processing system may also search its program pool for eligible inventory items based on the user's credit risk score. Accordingly, the data processing system can determine the affordability score and credit risk score associated with the consumer (step 1602). In some implementations, the affordability score and credit risk score may be included in the request from client application 114. In other embodiments, a data application (e.g., vehicle data application 150) augments a request from client application 114 with the affordability score or credit risk score. According to one embodiment, when a request to view inventory items is received, interface proxy service 204 routes the request to order service 220 and order service 220 augments the request with consumer context information from the order profile. In particular, order service 220 can augment the request with the affordability score and credit risk score received from user application service 210 and pass the augmented request to inventory service 230 as part of a search request.

At step 1604, the data processing system identifies a set of eligible inventory items for a consumer based on the consumer's affordability score, the monthly payment for each inventory item and other factors, such as geography or other factors. In one embodiment, the data processing system identifies the eligible inventory items as those having a base monthly payment (e.g., an adjusted base monthly payment) for a default usage band (say a mileage band of 10,000 miles) and corresponding to the consumer's credit risk score that is less than the consumer's affordability score. If the base monthly payment is not adjusted with the payments for the required add-on products in the inventory record, the inventory service may make this adjustment when searching for eligible vehicles. In the embodiment of FIG. 2, inventory service 230 may return the results to order service 210 and order service can return the results to client application 114 via interface proxy service 204. In any case, the data processing system can return inventory record information for the eligible inventory including, for example, the adjusted base monthly payment corresponding to a default mileage band and, in some embodiments, the consumer's credit risk, among other information (step 1604). In the example of FIG. 7B, there are 792 available eligible vehicles for the consumer.

According to one embodiment, the eligible inventory items comprise illiquid assets (or other assets that can act as collateral) (e.g., automobiles, boats, planes, real-estate, etc.). In some embodiments, an eligible inventory item may comprise a combination of an illiquid asset and an item that cannot be used as security. For example, an inventory item may comprise a vehicle with an included maintenance contract, warranty or other add-ons that cannot be used as security.

The consumer may provide consumer filter parameters to filter the set of eligible inventory items by various factors such as manufacturer, model, or other parameters. In the case of vehicles, for example, a user may search by parameters including, but not limited to new/used, make, model, trim, options, odometer reading, year, vehicle location or other factors. The data processing system can receive the filter parameters (step 1606), search the inventory records of the eligible vehicles and return inventory record data for the vehicles meeting the filter criteria (step 1608). For example, if a consumer who has been approved for a payment of $1,062 a month indicates that he or she is searching for inventory in San Francisco, Calif., the data processing system can present the consumer (e.g., through client application 114) with program pool vehicles within 25 miles (or other geographic region) of San Francisco that have a base monthly payment of $1062 or less for the credit risk band corresponding to the consumer and a default mileage band.

When inventory items are displayed to the consumer the vehicles may be sorted based on lowest initial fee, best value (price relative to fair market value (e.g., "above [average condition] MMR")) such that more fairly priced vehicles are listed first. This can further incentivize sellers to price vehicles as low as possible to the benefit of consumers. Inventory items can also be sorted by best payment, which helps drive customers to inventory items that depreciate less aggressively and therefore lend themselves to a lower payment than similarly priced cars that depreciate more aggressively.

The inventory items presented may be filtered by the maximum approved monthly payment or the suggested approved monthly payment for the consumer. In another embodiment, the data processing system may apply a scaling factor such that the data processing system will present the consumer with vehicles that have a monthly payment<=maximum approved payment*scaling factor (e.g., $400*0.7). The scaling factor may be selected to help ensure that the consumer can afford additional products, such as maintenance contracts, and expected additional expenses (gas, insurance, etc.). In any event, at this point, the consumer can view actual inventory from the sellers that fall within that individual's affordability as determined by the data processing system.

In addition or in the alternative, the data processing system may geofence inventory based on GPS coordinates provided by client application 114. Based on the GPS coordinates or other information, the data processing system can determine that a consumer is at a particular seller (e.g., dealer) and only present inventory items associated with that seller to the consumer. Thus, for example, if at step 1620, the consumer indicates via client application 114 that he or she is not interested in a particular inventory item, the data processing system can present to the consumer other inventory items at the same seller that meet the affordability and consumer filter requirements.

The consumer may select an inventory item from the set of eligible inventory items from the program pool (step 1610). According to one embodiment, interface proxy service 204 can receive a request from client application 114, forward the request to order service 220, order service 220 can augment the request with consumer context data, such as affordability score and credit risk score, and forward the augmented request to inventory service 230. Order service 220 may also access a table of tax rates (e.g., based on postal code in the order profile) and determine a tax rate. In another embodiment, order service 220 may determine a tax rate from an information provider system 120 (e.g., a vendor service 270). Order service 230 can augment the request with a tax rate.

Inventory service 230 returns additional inventory item detail data for the requested inventory item to order service 220. The inventory item detail data may include the array of payment schedules corresponding to the user's credit risk, for different usage bands. The array of payments may include the base monthly payment adjusted to include payments for required monthly add-ons (e.g., warranty, maintenance contract, etc.). The inventory item detail data can include the payments both with and without the tax rate applied. Order service 220 can store the responsive data returned by inventory service 230 in the order profile and return the inventory item detail data to client application 114 via interface proxy service 204.

Figure 7C:
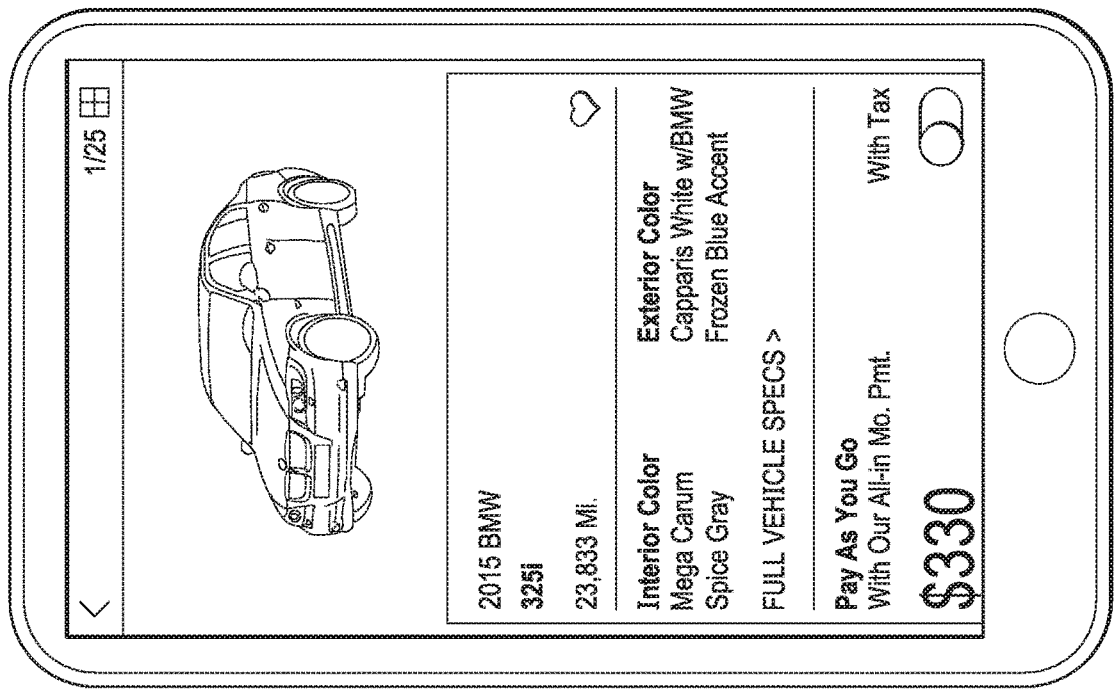
Figure 7B:
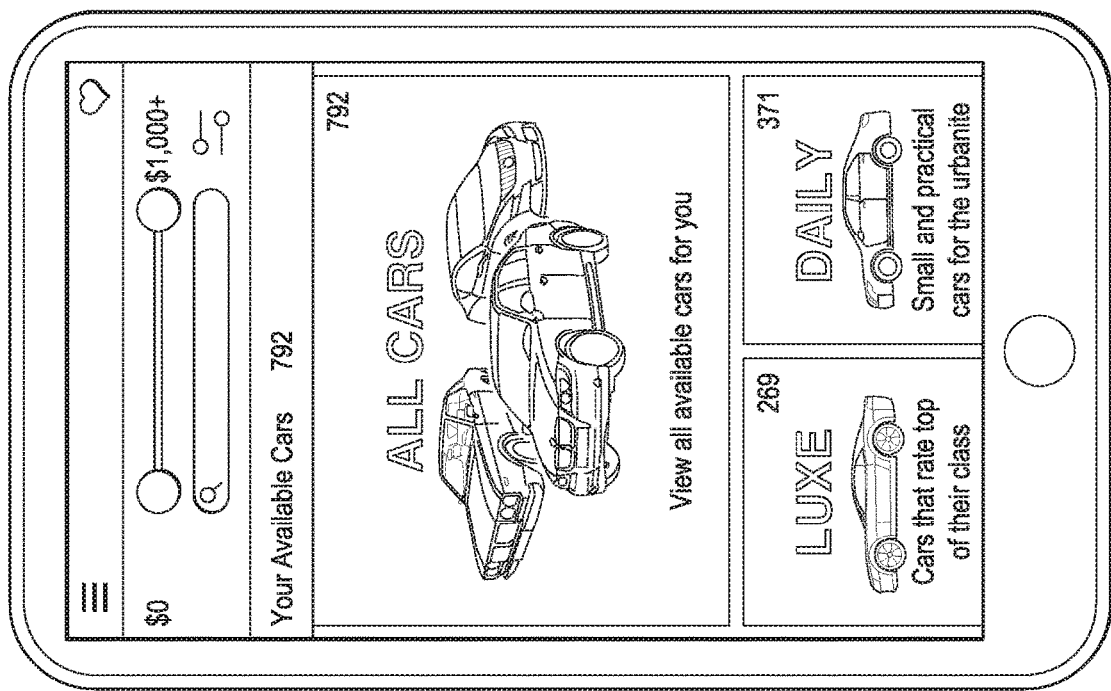

In FIG. 7C, the consumer has selected a particular vehicle with a base monthly payment of $330. The monthly payment initially displayed to the user corresponds to a default mileage band (e.g., 10,000 miles a year) and, in some embodiments, the consumer's credit risk band. Further, in the embodiment illustrated, the monthly payment includes a portion for an included insurance policy, maintenance policy and warranty.

Figure 7E:
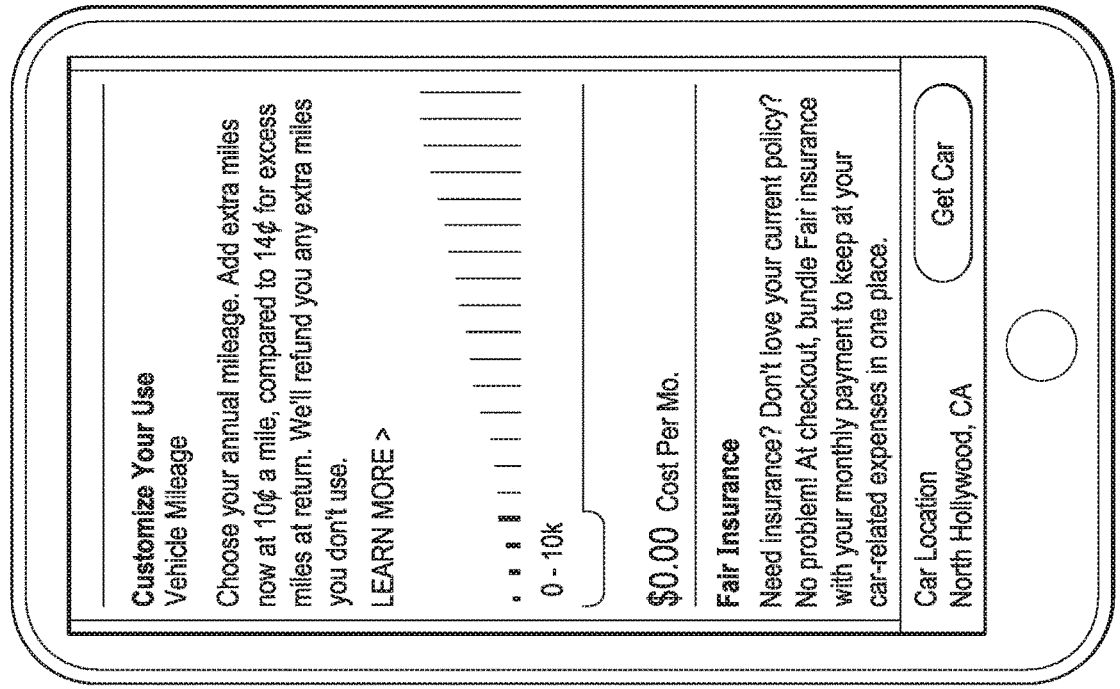
Figure 7D:
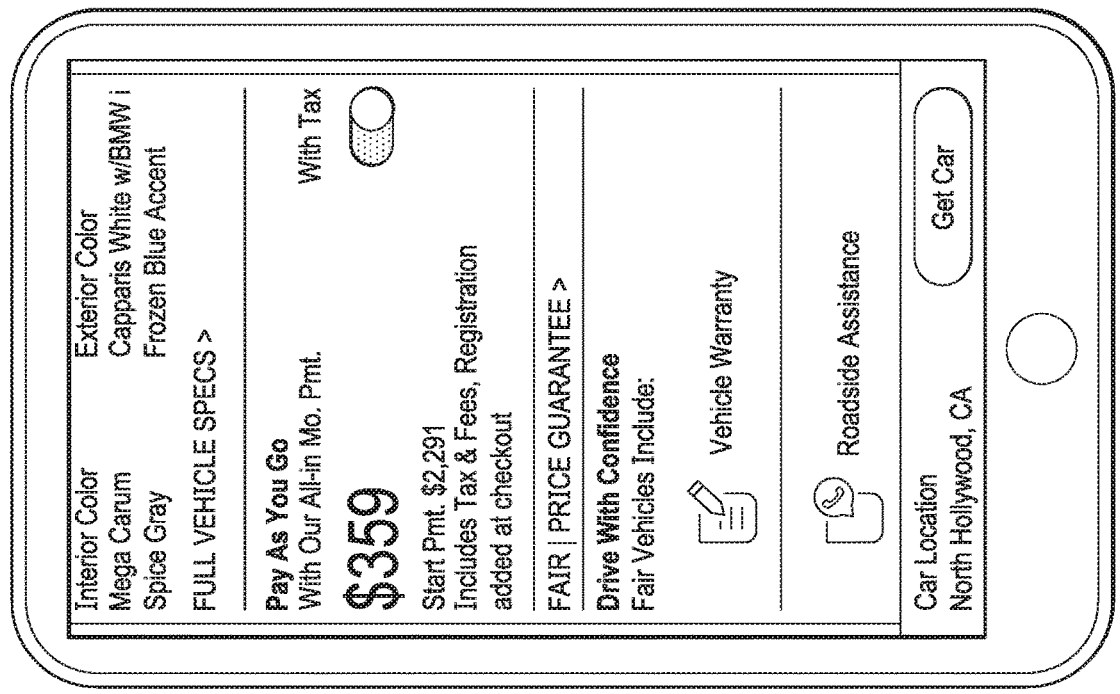

At step 1616, the data processing system can receive adjustments to the order payment parameters. The user may be provided with controls to adjust order payment parameters. As illustrated in FIG. 7D, the user can select to view the price with taxes. As another example, while the user may be shown a monthly payment based on a default mileage band, the user may be provided with controls to change the mileage band. For example, FIG. 7E illustrates an example in which the user is provided with a slider to adjust mileage band. It can be noted that, in some embodiments, the payment schedule for each mileage band may be provided to client application 114 when the user selects the particular vehicle. Thus, adjusting the slider of FIG. 7E may not require a call to the server. However, if the user selects to preview documents, the current setting can be sent to the data processing system. In another embodiment, a call can be made to the data processing system each time the slider is adjusted. This will cause the data processing system to return updated monthly payment based on the user's credit risk band and the selected mileage band.

Figure 7G:
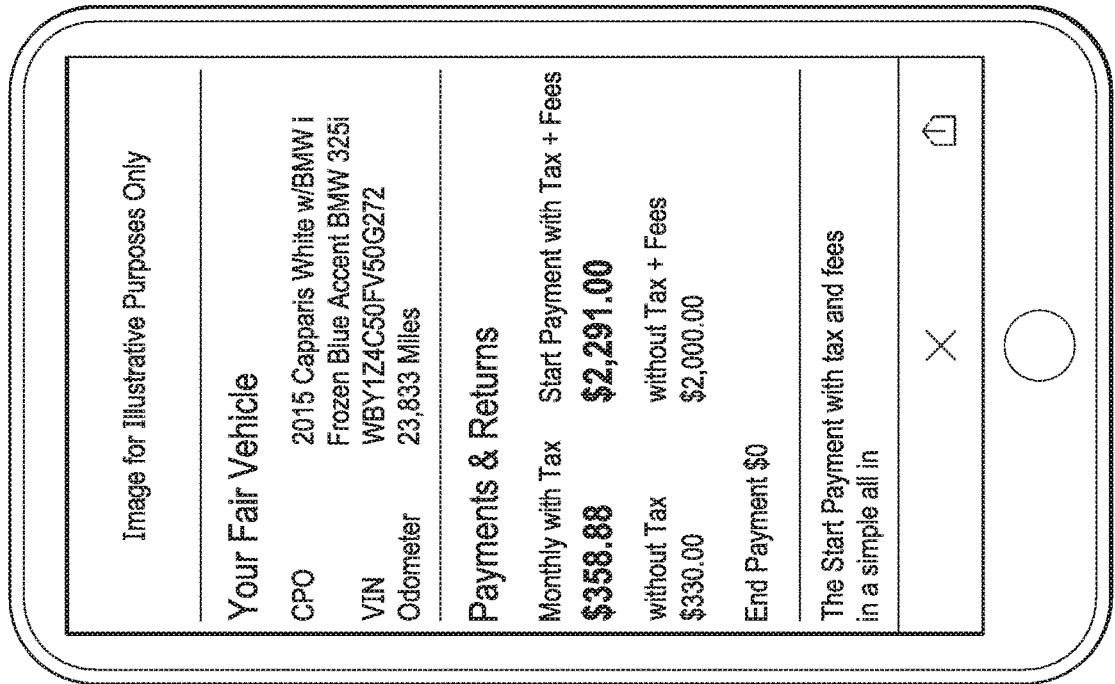
Figure 7F:
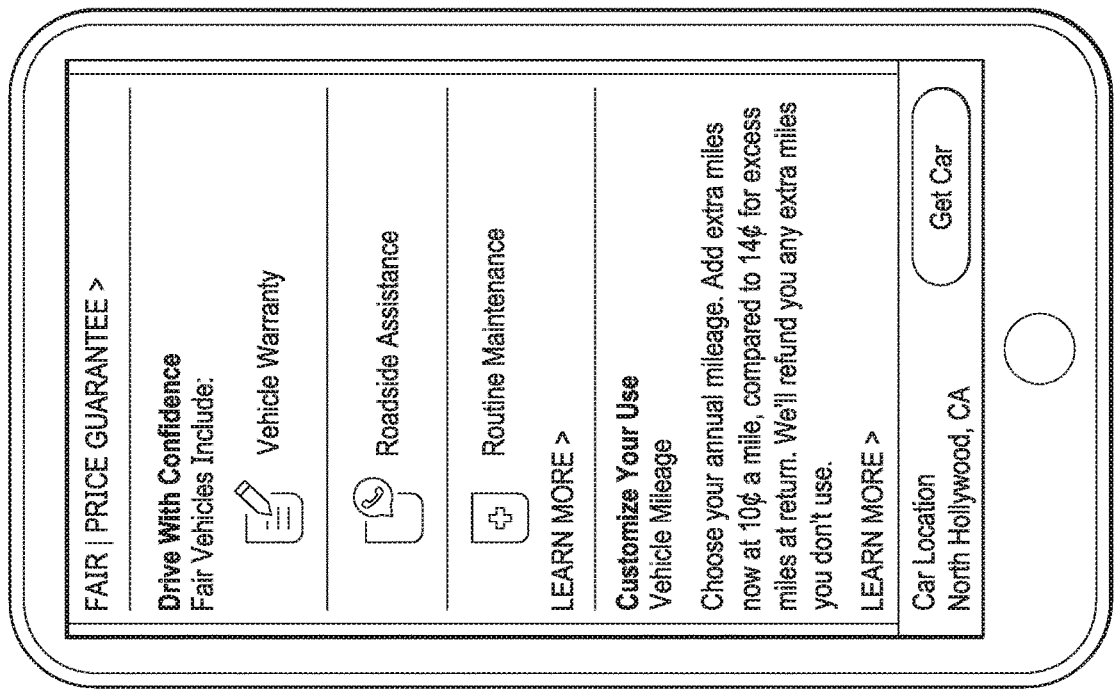

As another example, the user may be given the option to selection various optional products. As discussed above, the cost of insurance, maintenance contract, warranty or other items may be included in the monthly payment for the vehicle. For example, FIG. 7F illustrates that the vehicle comes with a vehicle warranty, roadside assistance and routine maintenance. In another embodiment, F&I products can be offered directly through the application 114 to the customer at a competitive rate. The user may be presented with F&I products that are available for purchase when the user selects a vehicle of interest. The user may be given the option to select these products through mobile application 114 in a shopping cart fashion or may be able to exclude certain products. This may occur before the consumer goes to the dealer.

According to one embodiment, the intermediary may negotiate terms of maintenance contracts or warranties with providers such that, unlike traditional maintenance contracts/warranties, the contracts/warranties may be month-to-month allowing the consumer to return the vehicle without unused term on the contract/warranty. The dealer can be paid an incentive upfront for the sale of such products and the intermediary may also add a monthly mark-up atop its underwriting cost. However, the total mark-up to the end customer can be notably less than an average dealer premium represents on traditional F&I products, such that the economics are distributed in a more economically advantageous way to the customer, while still properly incentivizing the dealer and intermediary. As F&I products, such as warranties/service contracts and others, can be added by default into the monthly payment where applicable, dealer penetration may improve notably, justifying a smaller mark-up by increasing sales penetration.

The selection of F&I products may affect the monthly payment. Whether included in the base monthly payment or provided as an add-on option, any contracts that are sold with the vehicle may be limited to contracts that are month-to-month, rather than fixed term. As such the consumer will not be stuck with, for example, a fixed term maintenance contract even if he or she wishes to return a vehicle early. In any event, in some implementations, the consumer rather than the dealer may control adding F&I products to the transaction and, in some cases, there may be no dealer interaction on F&I products through the data processing system.

At any point, the user may select to preview a purchase agreement. Because the start fee and monthly fees have been pre-calculated, the system may populate a preview version of the contract. Some items, such as registration fees or other fees entered by the dealer may be left empty at this point. According to one embodiment, in response to the user selecting to preview a purchase agreement, the data processing system can send the information to be included in the preview to a document service.

According to one embodiment, interface proxy service 204 can route a request to preview an agreement to order service 220. Because order server maintains a current state with the consumer information and vehicle data for the vehicle being currently viewed, order service 220 can forward the request, along with order profile data, to document service 224. The order profile may be forwarded as, for example, a structured JSON document such that the document service 224 can populate portions of a contract template with data from the order profile.

The document service can be configured to populate an HTML template or PDF template and provide the populated template to application 114 for viewing by the user. It can be noted, however, that some of the information may still be encrypted. FIG. 7G illustrates a user viewing a portion of the agreement populated with the monthly payment with taxes and the start payment with taxes and fees, though not all fees are included at this point.

Figure 7I:
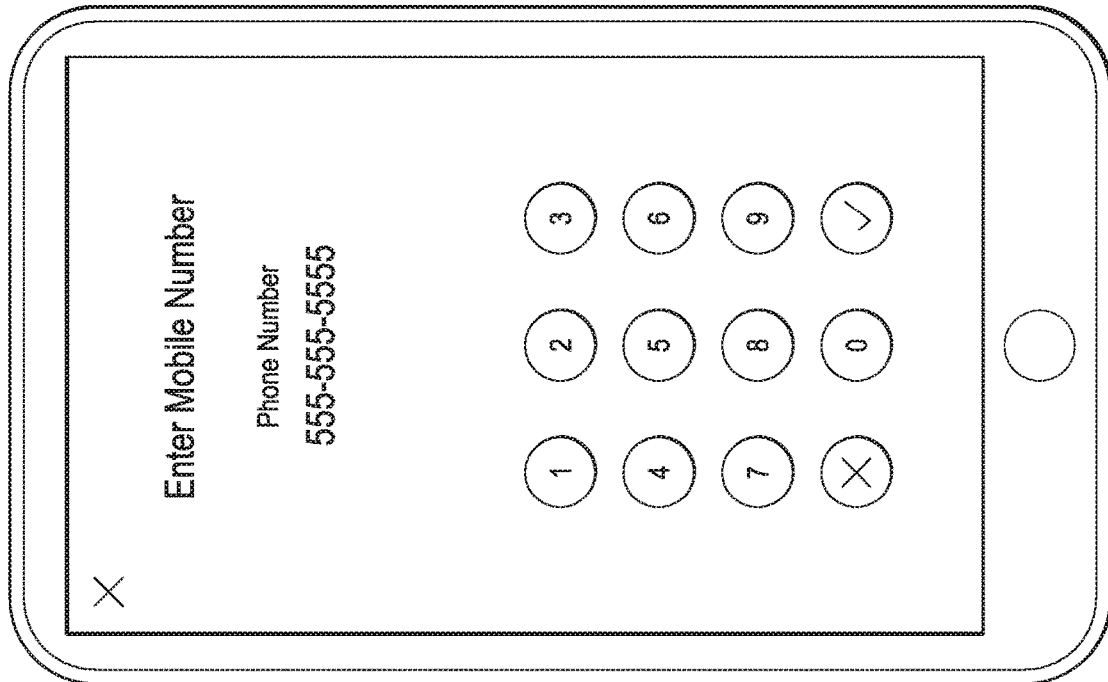
Figure 7H:
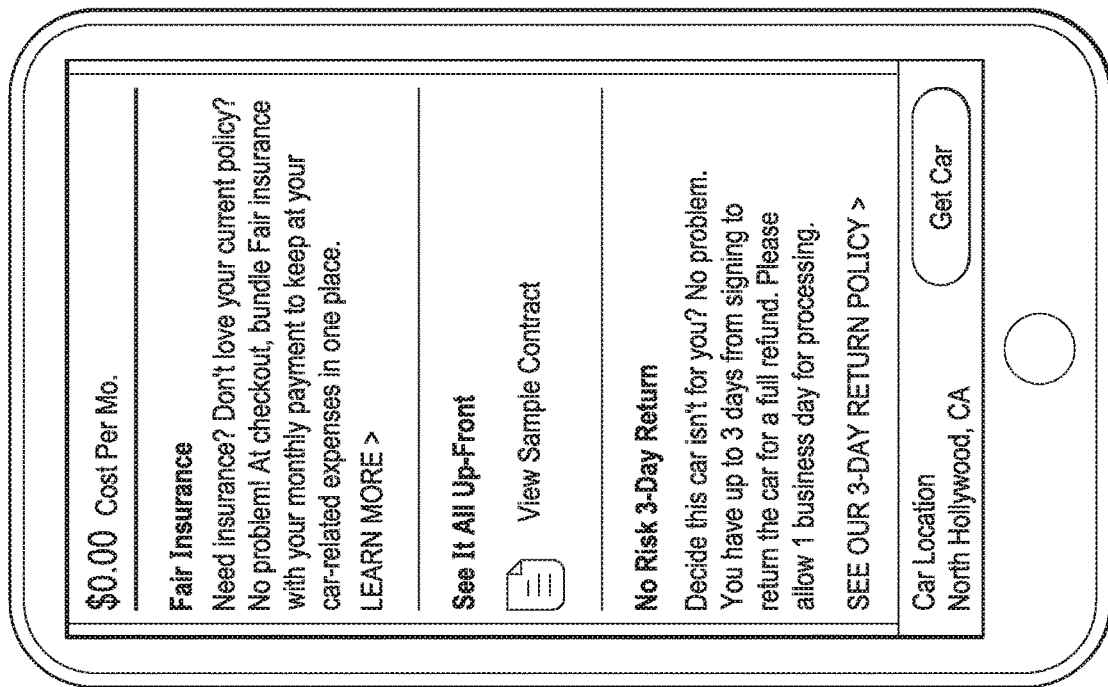

When a user makes a final purchase decision for a vehicle (step 1620) all the information about the vehicle, including the initial payment and monthly payment should be known by the data processing system. The user may indicate a purchase decision—a decision to proceed with the purchase of a particular vehicle—such as by clicking "Get Car" in the example interface of FIG. 7H. The user may enter contact information to allow the data processing system to contact the user when the vehicle is ready for pickup (FIG. 7I).

Figure 7K:
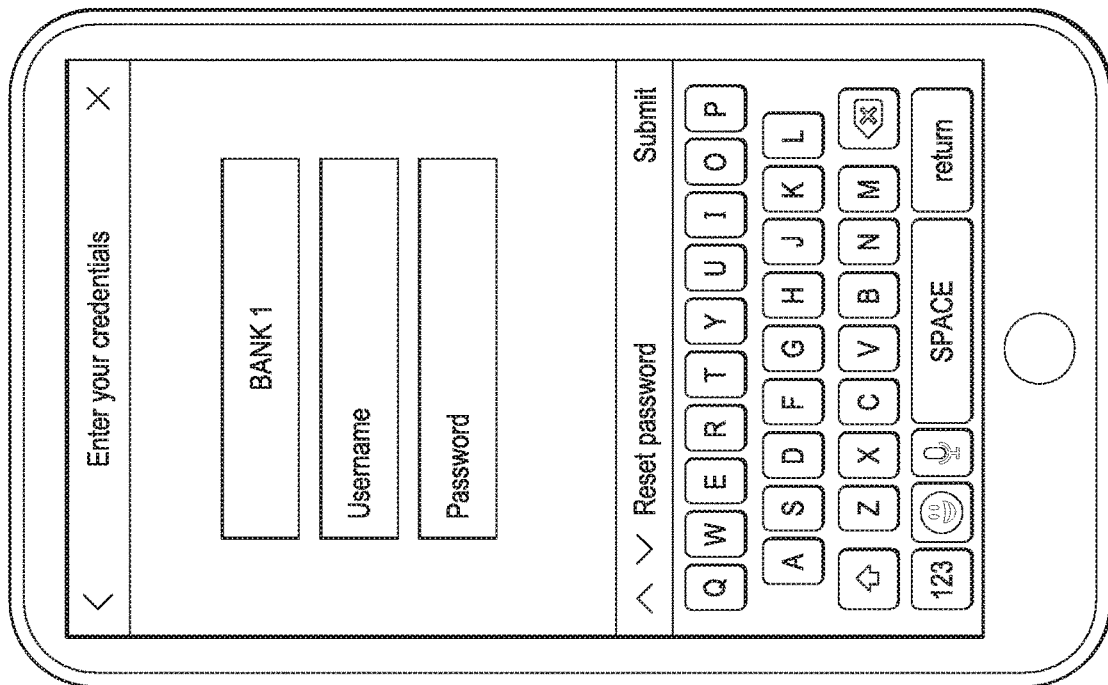
Figure 7J:
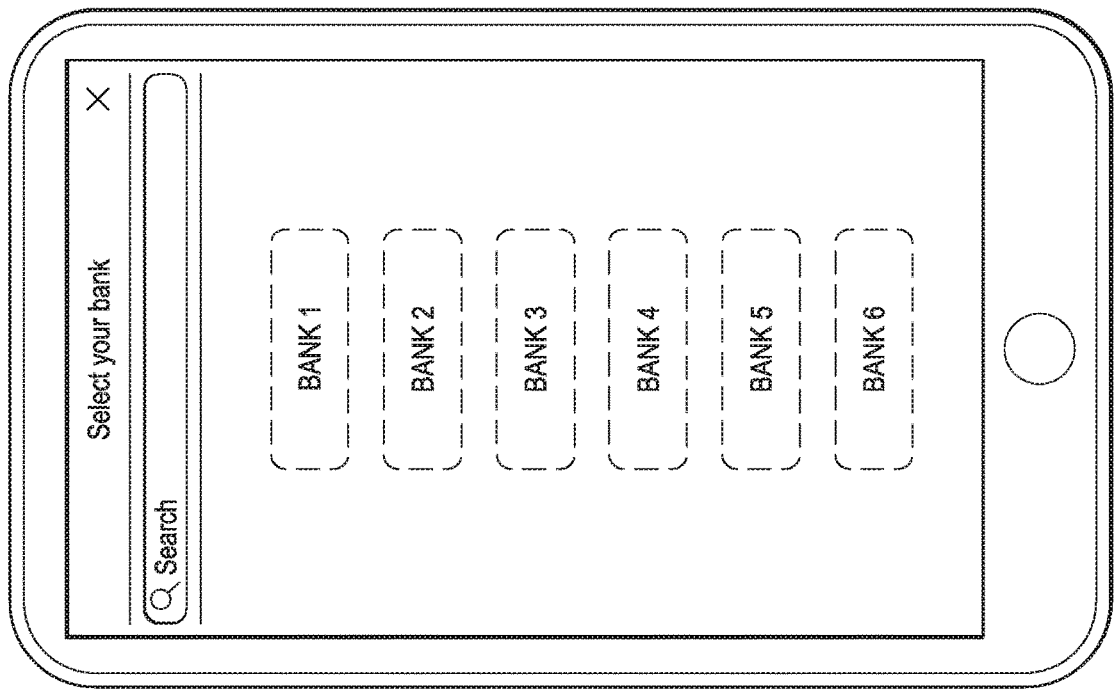
Figures 7L, 7M:
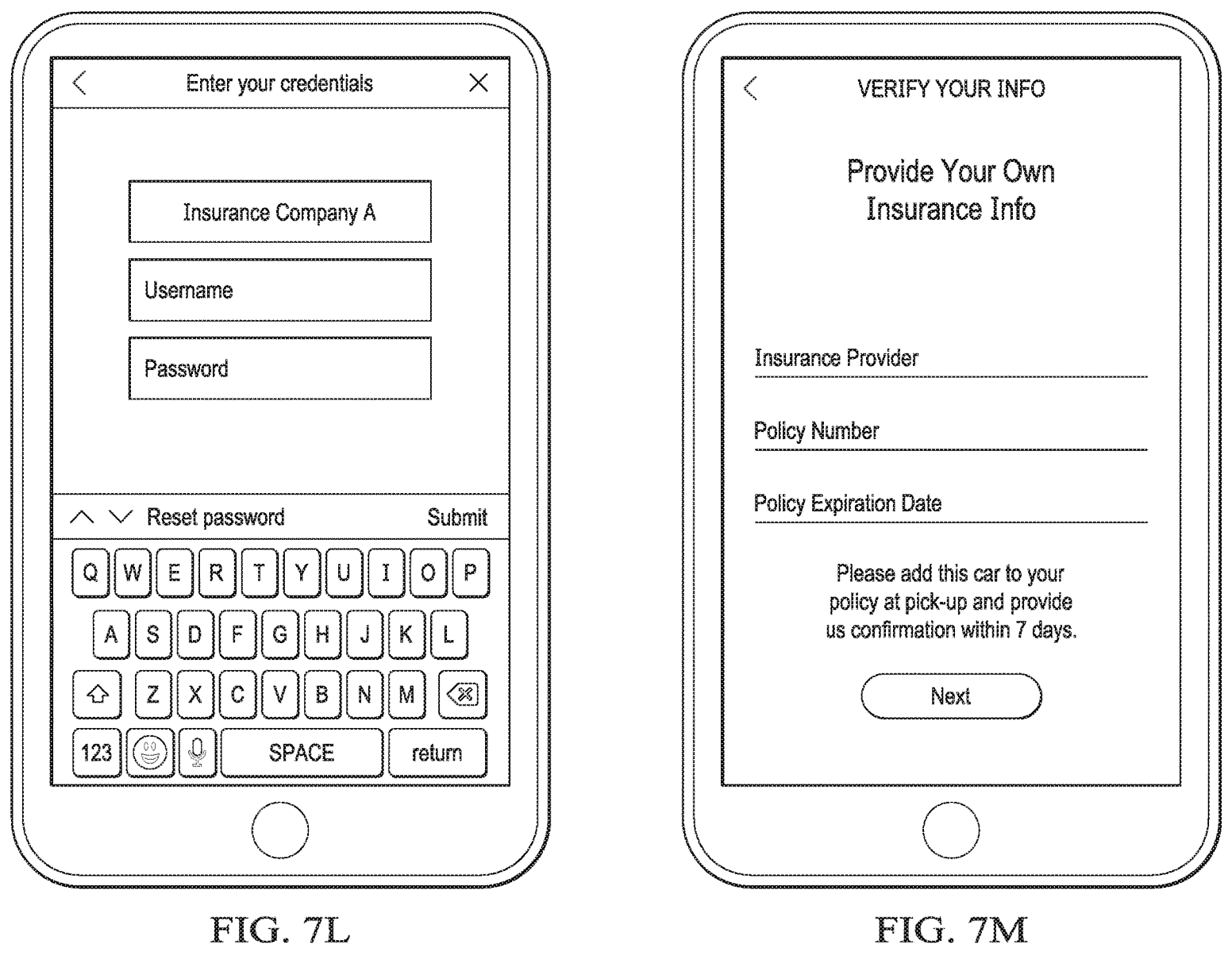

The user may be asked to perform several additional steps. For example, the user may be asked to link to his or her bank account for payment purposes (see e.g., FIGS. 7J-7K) and provide insurance information if insurance was not purchased through the data processing system (see e.g., FIG. 7L-7M).

When the user indicates a purchase decision (e.g., step 1620), the data processing system can create an "order" to capture the information about the transaction from the current context (e.g., vehicle information, financing information, consumer information or other information in the order profile for the user) (step 1621). The order may be managed as an object. The order may be associated with a contract package that includes any document digitally generated for the order. The data processing system may include an order state machine that tracks the status of the order and documents in the contract package.

Figure 7N:
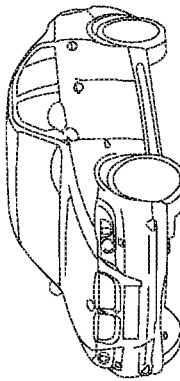

The data processing system can notify the dealer of the order via a dealer portal, email or other communications channel. The dealer may access an order and take various actions. FIG. 7N illustrates an embodiment of a dealer portal in which dealer can indicate whether the vehicle that is subject to an order is still available (step 1622). In addition, the dealer can verify the information in the order (step 1624). For example, a dealer can verify the odometer reading of the vehicle as illustrated in FIG. 7O. If the information to be confirmed (e.g., odometer reading) is different than what was included in the inventory record for the vehicle, the data processing system can notify the consumer (e.g., via app. 114) and determine if the monthly payment or start fee have changed. As illustrated in the example of FIG. 7P, the dealer may also specify certain fees that will be added to the initial payment, such as registration, license, transfer, smog, title, document or other fixed fees (step 1626). The dealer may also be provided the opportunity to provide various additional pieces of information. The various dealer inputs may be provided to the document service and the document service can generate digital documents using the inputs. The documents may be added to the contract package for the order.

Figure 7R:
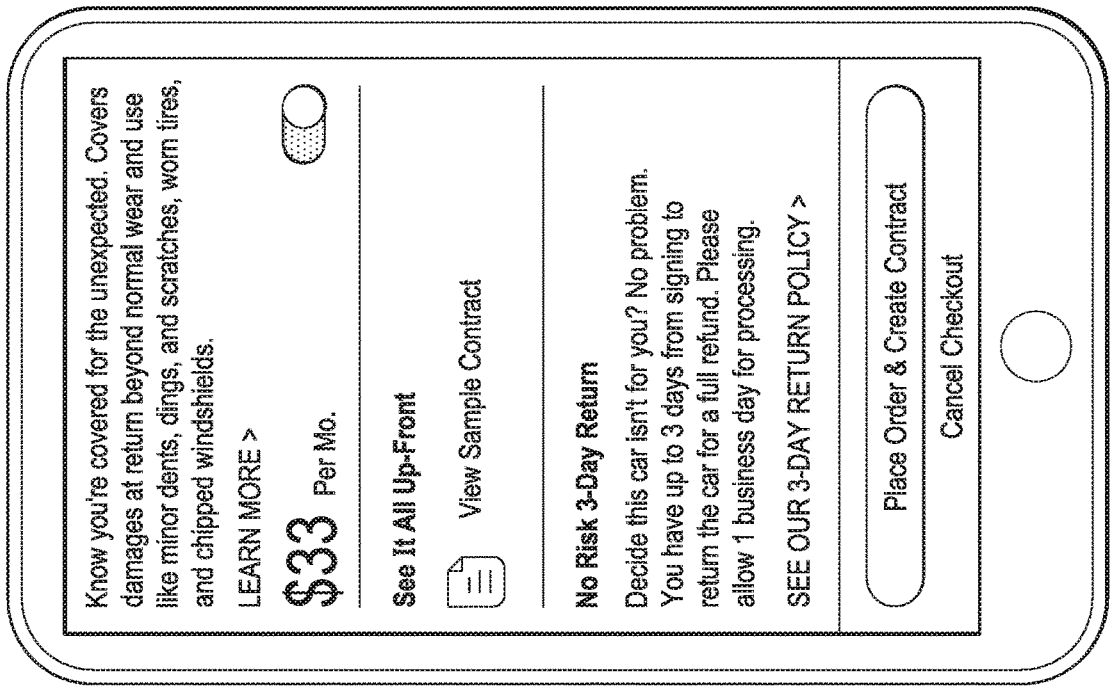
Figure 7Q:
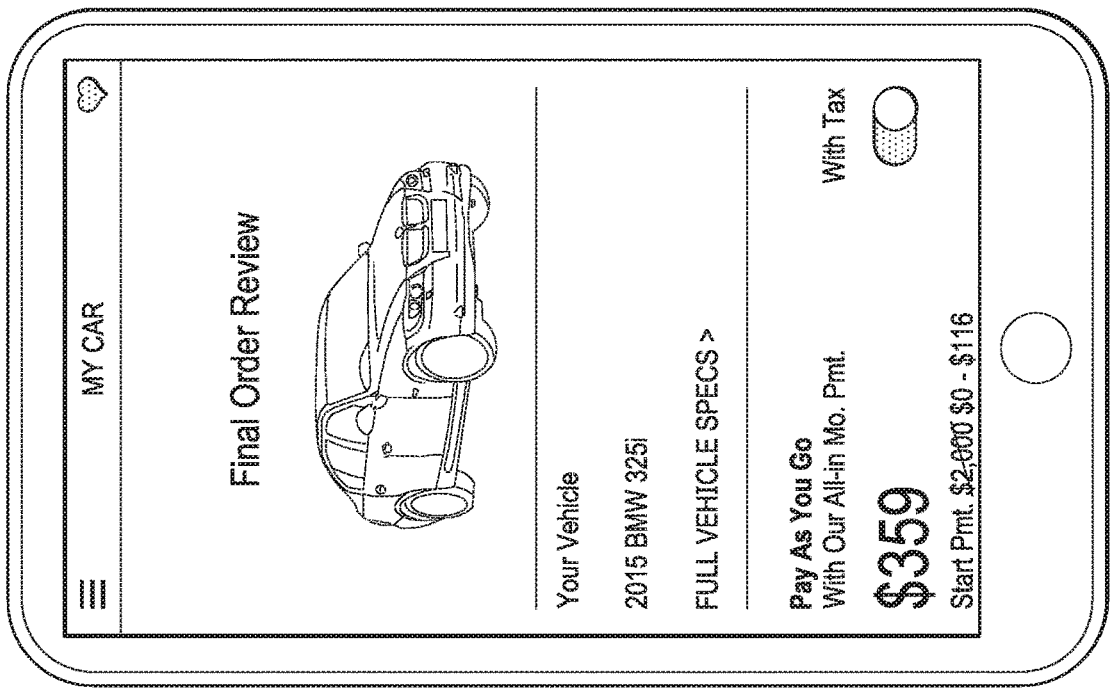
Figures 7S, 7U:
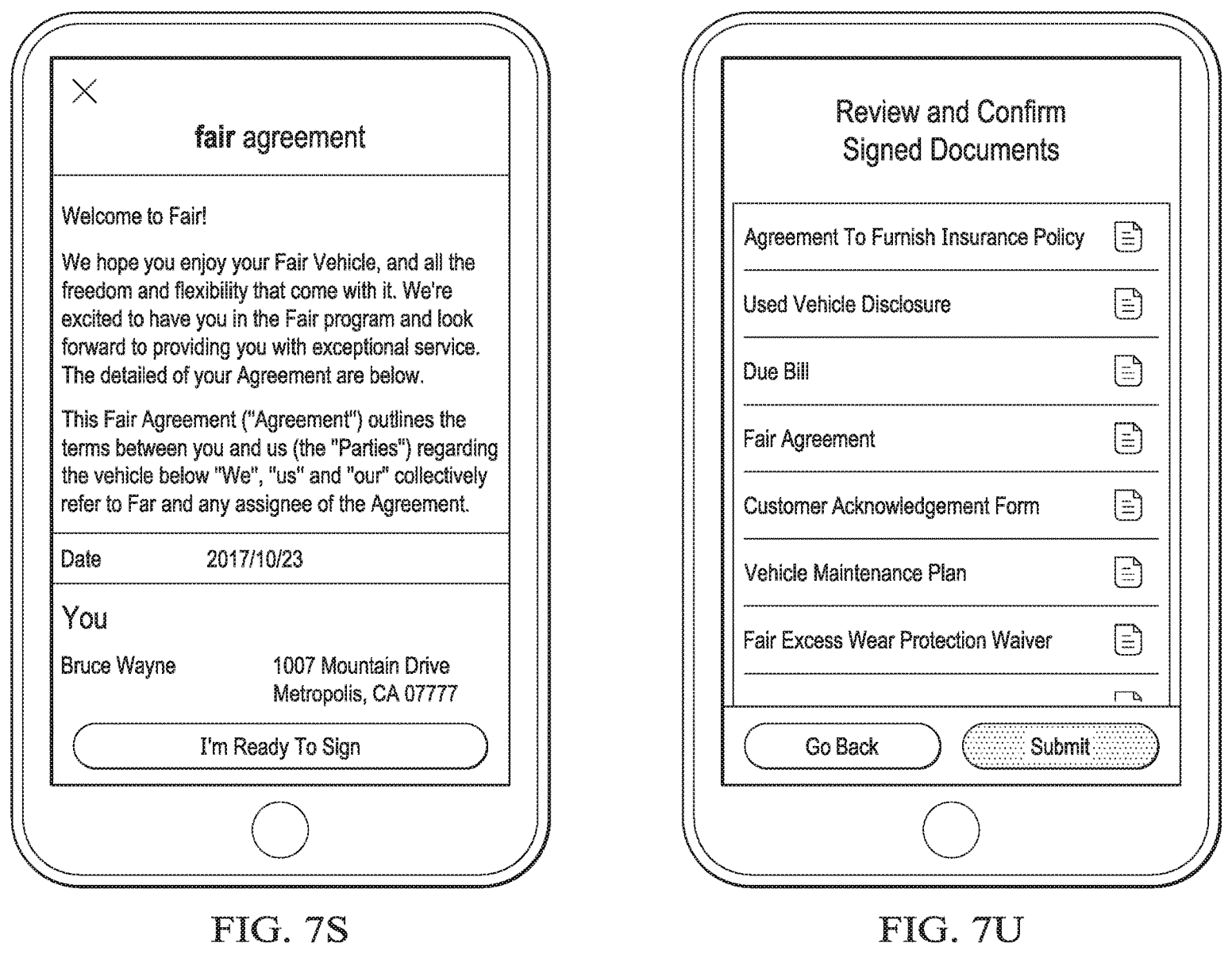

When the dealer has finished entering dealer provided information, the consumer can be notified via app. 114 and can perform a final order review (FIG. 7Q). The user may also be given the opportunity to add additional F&I products or other products (step 1628). In the example of FIG. 7R, for example, the user has selected to add on additional wear and tear protection.

When the terms of purchase are finalized (vehicle selected, additional products added), the consumer can indicate that the deal is finalized via app. 114 (for example, by selecting "Place Order and Create Contract"). Responsive to a signal to finalize an agreement based on user interaction in a GUI of client application 114, the data processing system can make a final approval decision (step 1630). If the user fails the final decision, the purchase may be denied. If the final decision is passed, the purchase can proceed.

In general, the final approval decision can involve doing a hard credit pull. The data processing system may apply rules/models to the hard credit report data for the consumer to make a make a final credit check determination using hard pull credit data before the consumer and dealer finalize a transaction. In some embodiments, the final approval decision may include re-running pre-approval rules. In one embodiment, order service 220 receives the request for final approval and makes a call to decision service 250 and requests a final approval decision from decision service 250.

The data processing system can calculate the final initial or monthly payments (step 1632), populate a final copy of the ownership agreement and other documents and provide the contract package for viewing by the user through the client application (step 1634). For example, order service 220 can send the order information to document service 230 and document service 230 can populate templates with the order data.

The documents included in the contract package may include a variety of documents related to purchase of a vehicle, including, but not limited to an ownership agreement, an ACH authorization to allow bank withdrawals, a due bill stating the amount due at signing (initial fee), used vehicle disclosure, agreement to furnish insurance policy (if insurance was not purchased through the data processing system), buyers guide, excess wear and tear contract (if excess wear and tear protection was purchased), vehicle warranty documents, vehicle maintenance plan, roadside assistance documents, insurance agreement if the user selected to purchase insurance through the data processing system) or other documents.

Figure 7T:
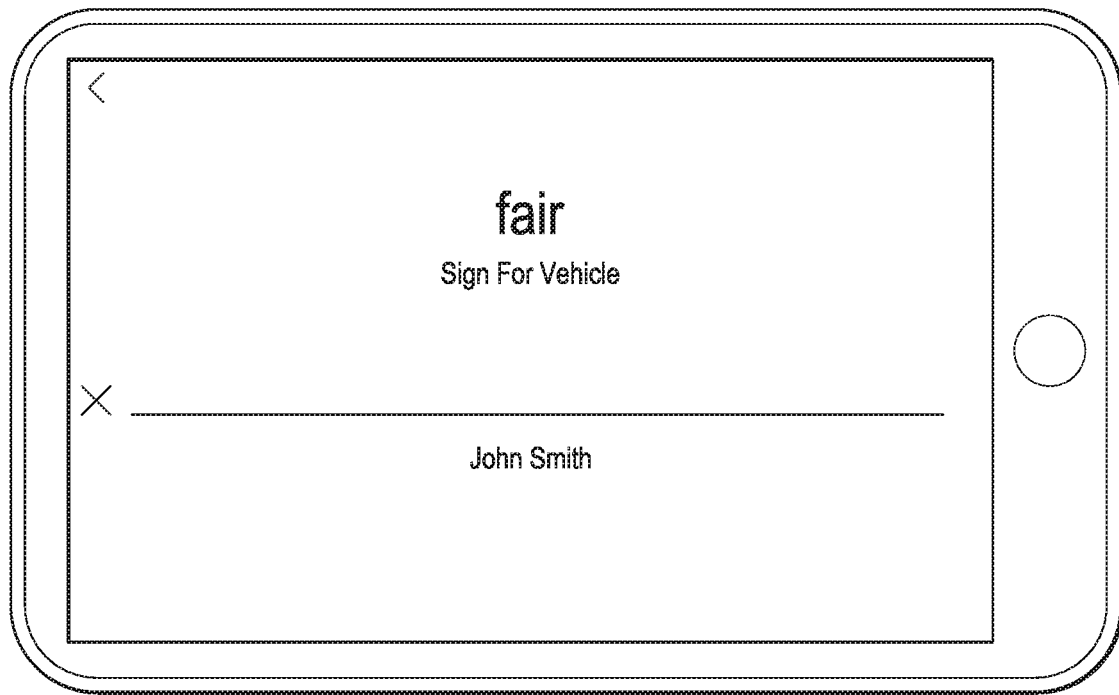

The user may be given the option of approving the transaction on his or her mobile device. In particular, the information for the order is digitized into an electronic document and sent to the application 114. Thus, if the consumer is satisfied, final documents can be pushed to application 114. FIG. 7S illustrates, for example, a portion of a final contract provided to the user via app. 114. The user can select "I'm Ready to Sign" (FIG. 7S) and be presented with an interface to allow the user to insert a digital signature (see, FIG. 7T). The digital signature may be applied to multiple documents in the contract package including, but not limited to, an ownership agreement, agreements for add-on products, disclosure documents and any other documents requiring the consumer's signature. For example, the signature and PDF documents can be provided to an e-contracting service which can apply the signature to the PDFs in the contract package. In one embodiment, the SMART SIGN service by eOriginal of Baltimore, Md. may be used, though other e-signature services may be used in other embodiments. The consumer is provided the opportunity to review each of these electronic signed documents in application 114 and submit the signed documents. FIG. 7U, for example, displays a list of documents in the contract package, including signed documents. If the user is satisfied with the documents, the user can submit the documents.

Thus, the consumer can execute the ownership agreement and other documents on his or her mobile device (step 1636). In some cases, all the documents may be executed digitally. Thus, the entire purchasing experience, in some embodiments, may be done digitally without pen and paper. In most cases there should be no documents that require a wet signature by the consumer, as the intermediary can sign any DMV forms that require wet signature, and the dealer may be able to sign on the intermediary's behalf through a Power of Attorney. The consumer may also cancel the transaction directly from his or her mobile device.

Upon acceptance by the consumer, the data processing system can withdraw the initial fee from the consumer's bank account (step 1638) and initiate transfer of funds from the intermediary's bank to the dealer's bank to provide the funds to the dealer to pay for the vehicle (e.g., via electronic transfer) (step 1640). The user can then pick up the vehicle (step 1642).

Thus, from the consumer's perspective, one embodiment of purchase process can include: 1. Customer downloads app; 2. Customer scans driver's license and confirms info; 3. Customer is fully-approved with no credit impact; 4. Customer picks car on which they are pre-qualified; 5. Dealer confirms vehicle availability; 6. Consumer picks desired add-ons; 7. Customer signs all forms in app; 8. Intermediary fully executes all forms electronically; 9. Consumer reviews signed documents and submits signed documents. 10. Customer picks up vehicle. Thus, the consumer's only direct interaction with the dealer is to pick up the vehicle. The consumer can thus purchase a vehicle (or other inventory item) from any location from which the consumer's device 110 has internet access or other network access to the data processing system.

With reference to FIG. 8A, FIG. 8B, FIG. 8C, FIG. 8D, and FIG. 8E, an embodiment of a structured JSON document 1800 with example values that can be sent from an order service 220 to a document service is illustrated. Note that the document of FIGS. 8A-8E represents a complete order. For a preview, a number of fields may be null, such as the doc. fee and other order data entered by the dealer and fields corresponding to selections not yet made by the user. The attributes and values included in document 1800 are provided by way of example only.

Figure 9:
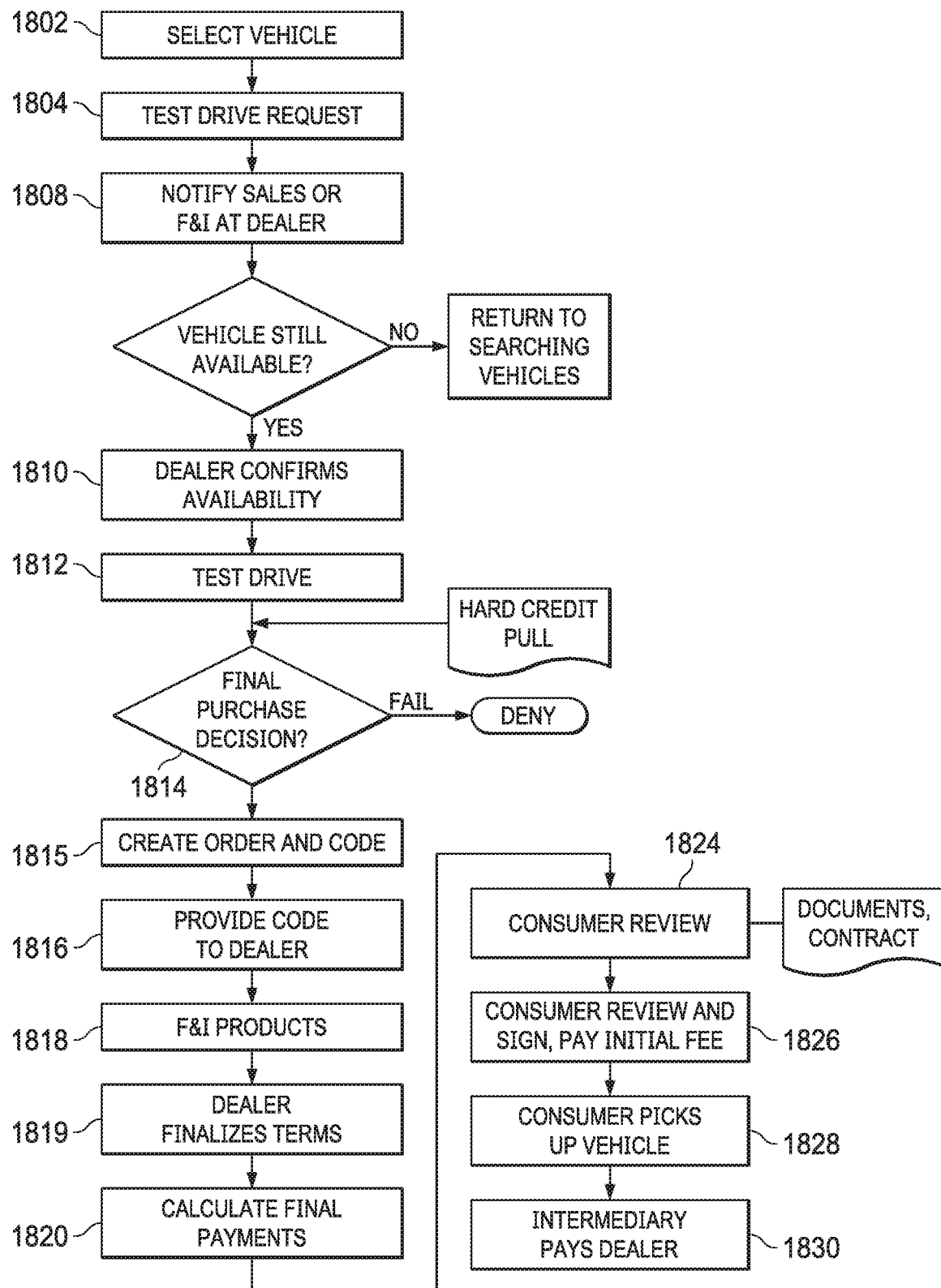
FIG. 9 is a flow chart illustrating another embodiment of performing a transaction.
Figure 10:
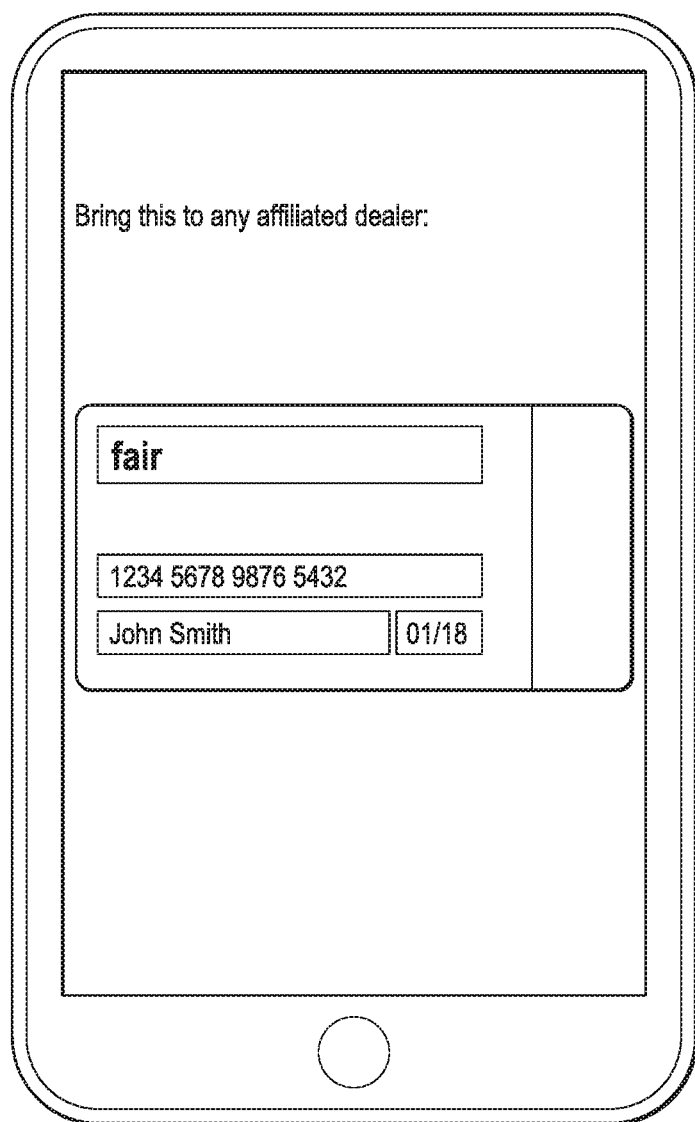
FIG. 10 illustrates one embodiment of a mobile application page presenting an activation code.

With reference to FIG. 9, illustrates another embodiment of a method for a purchase process that may be implemented via a data system, such as a vehicle data system 100. A user may search eligible vehicles and select an eligible vehicle of interest (step 1802) as discussed above. When the consumer identifies a vehicle of interest, he or she may request a test drive (step 1804) through client application 114. Vehicle data system 100 can send a test drive notification to the dealer associated with the vehicle of interest (step 1808). However, since inventory processing may occur as a batch process on a periodic basis (e.g., nightly), there is some chance that the vehicle selected by the consumer is no longer available. Accordingly, in response to being notified of a test drive request (or otherwise being notified of interest in a vehicle), the dealer can respond to vehicle data system 100 (e.g., via the dealer portal) or to the consumer to notify vehicle data system 100 or consumer whether the vehicle is still available. If the vehicle is not available, vehicle data system 100 can notify the consumer through client application 114 and the consumer can continue search for another vehicle of interest. If, on the other hand, the dealer confirms availability (step 1810), the consumer can schedule a test drive through vehicle data system 100 (step 1812) or with the dealer by another channel.

If the consumer is satisfied with the vehicle after the test drive (or without a test drive) the consumer or dealer can notify vehicle data system 100 of purchase decision. Responsive to a signal to finalize an a decision based on user interaction in a GUI of client application 114 or dealer interaction in a dealer system, automotive data processing system 100 can make a final approval decision (step 1814). In some embodiments, vehicle data system 100 may apply rules/models to the hard credit report data for the consumer to make a make a final credit determination before the consumer and dealer finalize a transaction. Making the final approval decision may include re-running a pre-approval decision.

If the user fails the final decision, the purchase may be denied. If the final decision is passed, the purchase can proceed and vehicle data system 100 can create an "order" to capture the information about the transaction from the current context (e.g., vehicle information, financing information, consumer information or other information in the order profile for the user) (step 1815). An activation code may also be generated and associated with the order.

Vehicle data system 100 may provide a number of mechanisms to provide a dealer with access to data specific to the transaction. According to one embodiment, vehicle data system may assign an activation code to the consumer where the activation code is associated with the consumer's profile at vehicle data system 100. The activation code may comprise a QR code, barcode, numeric code, URL or other code that can be used to uniquely identify the transaction. The dealer can be provided with the activation code (step 1816).

The activation code may be provided to the consumer and the consumer can show the activation code to the dealer so that the dealer can enter the activation code through the dealer portal to access information associated with the transaction. According to one embodiment, the activation code may be implemented as a virtual card that can be added to a mobile wallet of a mobile device. When the consumer arrives at the dealer, the consumer may present the virtual card to pay for the vehicle and any add-ons selected (up to the approved financing amount). FIG. 20, for example, illustrates an example embodiment of an application page in a client application 114 displaying a virtual card with an activation code.

In addition or in the alternative, vehicle data system 100 may send the activation code or other information directly to the dealer (e.g., via email, making the activation code available in a notification at the dealer portal or otherwise providing the activation code to the dealer) such that the dealer can use the activation code in the dealer portal to access information needed to complete the transaction. For example, in one embodiment, vehicle data system 100 can push the activation code, vehicle identification information and identification information for a consumer to the dealer when vehicle data system 100 notifies the dealer of a test drive request. Vehicle data system 100 may provide information, such as the photo of the consumer's driver's license or other PII, so that the dealer can confirm that the consumer present to test drive or purchase the vehicle is in fact the consumer registered with vehicle data system 100.

In response to an activation code signal from the dealer portal indicating that the dealer has input or selected the activation code, vehicle data system 100 may push information associated with the transaction to the dealer portal. Such information may include, for example, information about the consumer, information about the vehicle, documents, or information for display in an order review interface. In one embodiment, the dealer may be provided with information about the consumer such as the maximum or suggested approved monthly payment, maximum approved financing amount, PII or other information used to complete a transaction.

In some embodiments, a vehicle selected by the consumer is associated with the activation code or the consumer's profile such that, when the dealer enters or selects the activation code, the dealer can be provided with information regarding the vehicle. In another embodiment, the dealer may enter or select the activation code and enter the VIN number or other information associated with the transaction through the dealer portal.

Based on the VIN number and consumer associated with the activation code, vehicle data system 100 may present vehicle information and options to the dealer through the dealer portal to allow the dealer to select add-ons (discussed below).

Vehicle data system 100 may provide a notification to the consumer through client application 114 that the dealer has entered the activation code. Vehicle data system 100 may also push information associated with the transaction to client application 114, such as information about the vehicle, add-ons, price and other information.

Various F&I products may be purchased with a vehicle. As discussed above, for example, it may be desirable to include a maintenance contract or warranty with each vehicle. In some embodiments, the cost of the maintenance contract, warranty or other items may be included in the monthly payment for the vehicle. Whether included in the monthly payment or provided as an add-on option, any contracts that are sold with the vehicle may be limited to contracts that are month-to-month, rather than fixed term. As such the consumer will not be stuck with, for example, a fixed term maintenance contract even if he or she wishes to return a vehicle early.

In another embodiment, the dealer may be given the option through the dealer portal to sell the consumer additional approved products, such as warranties/maintenance contracts (e.g., if not already included in the vehicle payment structure), wheel and tire protection, extended mileage, options and other products (step 1818). In some embodiments, vehicle data system 100 may limit the products that a dealer can add to a purchase to a set of curated products that the intermediary has approved for sale.

Vehicle data system 100 may limit the products that the dealer can add, or that a consumer can select, for the vehicle purchase based on the consumer's maximum or suggested affordability score. For example, if vehicle data system determines that a consumer has a maximum affordable payment of $400 a month and the consumer has selected a vehicle with a payment of $300 a month, vehicle data system 100 can limit the dealer to selling a product or combination of products such that the total monthly payment is < or =$400. In addition or in the alternative, vehicle data system 100 may limit the additional products that can be added to the purchase such that the vehicle payment makes up at least a minimum percentage of the monthly payment. In some cases, the dealer may be shown in the dealer portal the affordability scores for the consumer so that dealer can best select additional products to offer to the consumer.

Client application 114, in some embodiments, may be connected to the dealer portal through, for example, API services provided by vehicle data system 100. As add-ons are selected/rejected by the dealer or consumer, vehicle data system 100 can push information to the dealer portal and client application to update the dealer portal and client application 114 interface to reflect the current state of the transaction (e.g., to show selected vehicle and add-ons and current price/payment schedule based on selected vehicle and add-ons).

Vehicle data system 100 may automatically populate documents to account for the F&I products selected by the user or added by the dealer.

When the terms of purchase are finalized (vehicle selected, additional products added), the dealer can indicate that the deal is finalized via the dealer portal (step 1819). The vehicle data system 100 can calculate the final initial or monthly payments (step 1820), populate a final copy of the ownership agreement and other documents and present the ownership agreement and other documents required for the purchase to the consumer through the client application (step 1824).

The user may be given the option of approving the transaction on his or her mobile device. If the consumer is satisfied, final documents can be pushed to application 114 and the consumer can execute the ownership agreement and other documents on his or her mobile device (step 1826). In some cases, all the documents may be executed digitally. Thus, the entire purchasing experience, in some embodiments, may be done digitally without pen and paper. Documents that require a wet signature, if any, can be printed by the dealer for signature by the consumer. In most cases there should be no documents that require a wet signature by the consumer, as the intermediary can sign any DMV forms that require wet signature, and the dealer may be able to sign on the intermediary's behalf through a Power of Attorney. The consumer may also cancel the transaction directly from his or her mobile device.

Upon acceptance by the consumer, vehicle data system can withdraw the initial fee from the consumer's bank account. The consumer can pick up the vehicle (step 1828) and the data processing system can initiate transfer of funds from the intermediary's bank to the dealer's bank to provide the funds to the dealer to pay for the vehicle (e.g., via electronic transfer) (step 1830).

Thus, from the consumer's perspective, one embodiment of purchase process can include: 1. Customer downloads app; 2. Customer scans driver's license and confirms info; 3. Customer is fully-approved with no credit impact; 4. Customer picks car on which they are pre-qualified and requests test drive; 5. Dealer confirms vehicle availability; 6. Customer visits and test drives cars; 7. Salesperson enters activation code into dealer portal on their phone or computer to confirm vehicle and deal information and their commitment to sell; 8. Customer picks all desired add-ons; 9. Customer signs all forms in app; 10. Dealer countersigns all forms in portal; 11. Intermediary fully executes all forms electronically; 12. Customer drives off.

Embodiments described herein not only overcome the deficiencies of prior computer systems, but also facilitate "micro-ownership." With micro-ownership, the consumer may pay an initial, larger fee, and lower fixed monthly payments. Under an ownership agreement, the consumer may make monthly payments, but unlike with a lease, the consumer has the flexibility to return the vehicle when he or she no longer wishes to pay for the vehicle. Since a consumer can return the vehicle at any time, micro-ownership can eliminate default. And, unlike rental contracts that have terms typically limited to 30 days, the ownership agreement does not have to be renewed continually.

The computer system facilitates this type of ownership through the application of rules/models to inventory items to select inventory items that are priced close to their wholesale values at the start of the agreement and determine payments for the inventory items that meet particular metrics (e.g., an ROA hurdle or other metric) so that the ownership agreement can be viable for an intermediary providing financing without requiring a fixed term.

The payments for a vehicle may be based on residual value models which incorporate assumptions regarding miles per year and vehicle condition. As such, the ownership agreement may require the consumer to maintain the vehicle, maintain insurance on the vehicle or take other actions so that the vehicle should not depreciate more rapidly than predicted when the initial and monthly payments were determined. The consumer may also have the option of purchasing additional miles-per-year at the time of sale. Within certain limits, though, the consumer may return a purchased vehicle without further obligation.

In particular, because, in some embodiments depreciation curves are only determined for a single mileage band (e.g., 10,000 mi/year). Moreover, the residual value rules/models used to determine payments on the vehicle may be based on this mileage band (e.g., 10,000 mi/year). A user who drives more than that can be given the option (by the dealer or through the application) to purchase an additional mileage allowance. The cost of additional mileage may vary by vehicle based on the associated depreciation models. In some embodiments, the ownership agreement may provide for a refund of all or a portion of unused additional mileage at cost.

In one embodiment, the additional mileage allowance can be prorated and if all of the prorated additional mileage allowance is not used, the consumer can be refunded for any unused miles down to the original, default mileage in the system. For example, if the base mileage is 10,000 mi/year, the consumer purchases an additional 5,000 mi/year and customer then returns the car and ends the contract after 6 months and after having driven only 4,000 mi., the consumer can be refunded for the pro-rated mileage allotment. For example, the customer can be refunded for 2,500 mi., e.g., 10,000 default mi+5,000 purchased mi=15,000 mi/year Years driven=6 mo/12 mo=½ year Miles allowed=½ *15,000=7,500 mi Miles driven=4,000 mi Excess Miles Bought=7,500−4,000=3,500 mi Max Refund: Miles bought−Base Miles=7,500−5,000=2,500 mi Refund: Lesser of Excess Miles Bought and Max Refund=2,500 mi In any event, the ownership agreement may provide for additional payments at vehicle return if the vehicle is returned with excessive mileage, excessive wear and tear, evidence of accidents, etc. Therefore, further obligations may exist when the consumer returns the vehicle if the vehicle has excessive mileage or wear and tear or exhibits evidence of an accident.

According to some embodiments, the vehicle initial payment and monthly payment (plus mileage allowance) are selected to allow the consumer to return the vehicle at any time, within limits and with sufficient notice, without further obligation. The ownership agreement may include terms, for example, that require minimum maintenance and repairs, etc. such that owner may have some remaining obligation if the vehicle is returned in poor condition. Furthermore, the owner may have to pay for mileage that goes beyond a base mileage (e.g., 10,000 mi/year), extended mileage allowance purchased by the owner or mileage band selected by the consumer.

When the owner decides to return a vehicle, the owner will bring the vehicle back to the selling dealer, or to another location mutually agreed upon with the intermediary. Prior to return, the intermediary may send a mobile inspector to meet the owner at a location convenient to the owner where the vehicle can be inspected to have wear and tear or damage assessed. As long as there is not excessive mileage, wear and tear, damage, etc., the consumer can walk away from the vehicle.

Figure 11:
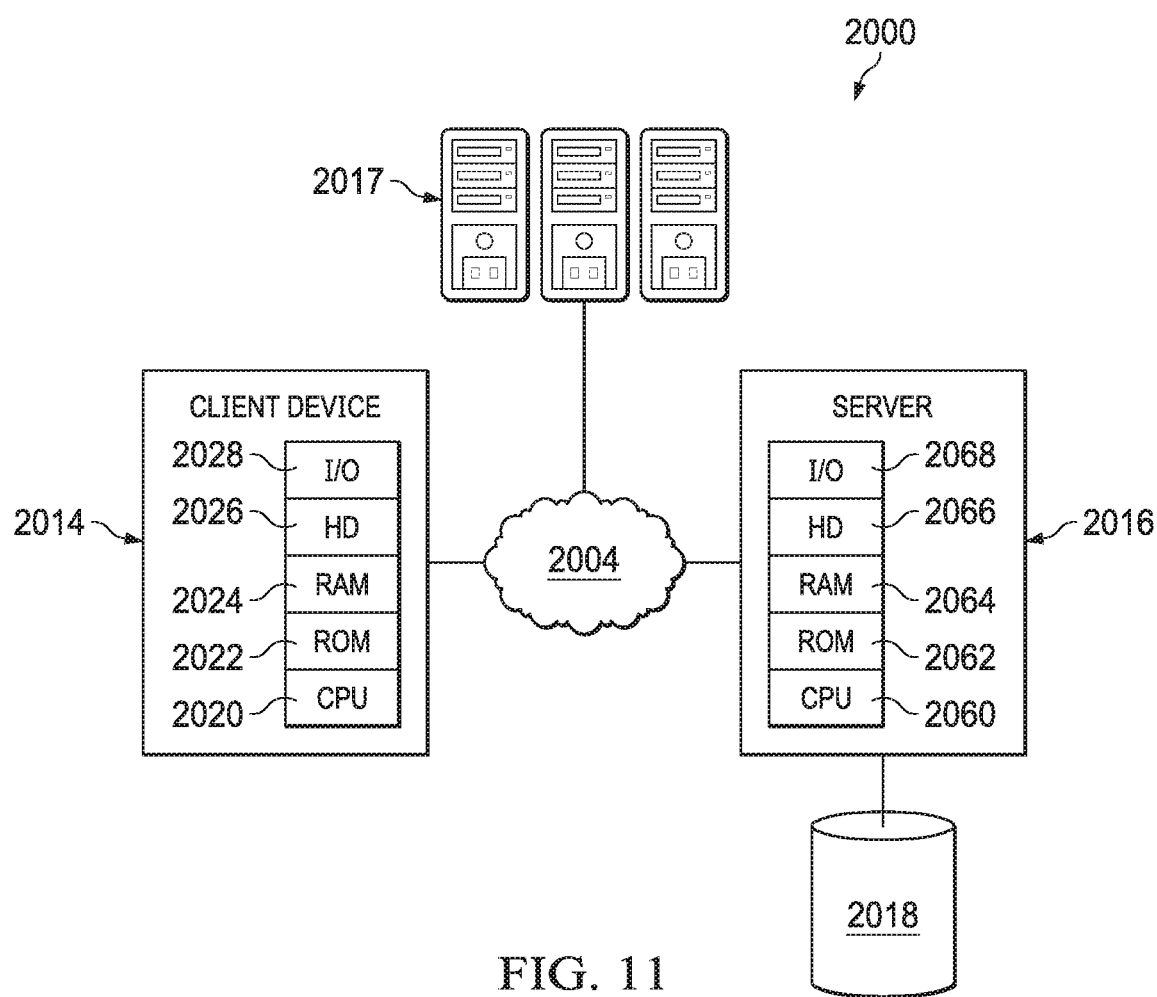
FIG. 11 depicts a diagrammatic representation of a distributed network computing environment.

FIG. 11 depicts a diagrammatic representation of a distributed network computing environment where embodiments disclosed can be implemented. In the example illustrated, network computing environment 2000 includes network 2004 that can be bi-directionally coupled to a client computing device 2014, a server system 2016 and one or more third party system 2017. Server system 2016 can be bi-directionally coupled to data store 2018. Network 2004 may represent a combination of wired and wireless networks that network computing environment 2000 may utilize for various types of network communications known to those skilled in the art.

For the purpose of illustration, a single system is shown for each of client computing device 2014 and server system 2016. However, a plurality of computers may be interconnected to each other over network 2004. For example, a plurality client computing devices 2014 and server systems 2016 may be coupled to network 2004.

Client computer device 2014 can include central processing unit ("CPU") 2020, read-only memory ("ROM") 2022, random access memory ("RAM") 2024, hard drive ("HD") or storage memory 2026, and input/output device(s) ("I/O") 2028. I/O 2028 can include a keyboard, monitor, printer, electronic pointing device (e.g., mouse, trackball, stylus, etc.), or the like. In one embodiment I/O 2028 comprises a touch screen interface and a virtual keyboard. Client computer device 2014 may implement software instructions to provide a client application configured to communicate with a data processing system. Likewise, server system 2016 may include CPU 2060, ROM 2062, RAM 2064, HD 2066, and I/O 2068. Server system 2016 may implement software instructions to implement a variety of services for a data processing system. These services may utilize data stored in data store 2018 and obtain data from third party systems 2017. Many other alternative configurations are possible and known to skilled artisans.

Each of the computers in FIG. 11 may have more than one CPU, ROM, RAM, HD, I/O, or other hardware components. For the sake of brevity, each computer is illustrated as having one of each of the hardware components, even if more than one is used. Each of computers 2014 and 2016 is an example of a data processing system. ROM 2022 and 2062; RAM 2024 and 2064; HD 2026, and 2066; and data store 2018 can include media that can be read by CPU 2020 or 2060. Therefore, these types of memories include non-transitory computer-readable storage media. These memories may be internal or external to computers 2014 or 2016.

Portions of the methods described herein may be implemented in suitable software code that may reside within ROM 2022 or 2062; RAM 2024 or 2064; or HD 2026 or 2066. The instructions may be stored as software code elements on a data storage array, magnetic tape, floppy diskette, optical storage device, or other appropriate data processing system readable medium or storage device.

While the foregoing embodiments were provided primarily in the context of an automotive data processing system, it will be appreciated that embodiments described herein may be applied to other assets (e.g., real-estate, boats, etc.). In particular, embodiments may be adapted for assets for which depreciation can be modeled. Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

To the extent particular values are provided in any example embodiments in the description, such values are provided by way of example and not limitation. Moreover, while in some embodiments rules may use hardcoded values, in other embodiments rules may use flexible values. In one embodiment, one or more of the values may be specified in a registry, allowing the value(s) to be easily updated without changing the code. The values can be changed, for example, in response to analyzing system performance.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A data processing system comprising:
a data store storing a set of inventory records for each vehicle in a program pool of individual vehicles, each inventory record including a payment schedule comprising an initial fee and a periodic fee for an associated individual vehicle;
a processor and a memory coupled to the processor storing a set of computer executable instructions, the set of computer executable instructions executable to:
receive, from a mobile application, a selection of a vehicle from the program pool by a user;
retrieve the inventory record for the selected vehicle and provide vehicle information from the inventory record for the selected vehicle to the mobile application for display in an operator interface of a mobile device;
create, at the server, an order to capture information about a transaction, including the vehicle information from the inventory record for the selected vehicle and user information about the user;
store order information in the order at the server, the order information comprising the user information about the user and the vehicle information about the selected vehicle from the inventory record for the selected vehicle;
provide, by the server, access to the order via a dealer portal to allow a dealer associated with the selected vehicle to update order information;
receive a request from the mobile application to view an electronic document associated with the selected vehicle, wherein the electronic document associated with the selected vehicle includes an electronic agreement;
responsive to the request to view the electronic document, automatically populate the electronic document with the order information; and
communicate the electronic document to the mobile application for presentation in the operator interface of a mobile device.

2. The data processing system of claim 1, wherein the set of computer executable instructions is further executable to generate a unique activation code linked to the order and provide the unique activation code to the mobile application.

3. The data processing system of claim 2, wherein the unique activation code is usable by the dealer portal to access the order.

4. The data processing system of claim 3, wherein the set of computer executable instructions is further executable to push order information to the dealer portal in response to receiving an activation code signal from the dealer portal including the unique activation code.

5. The data processing system of claim 1, wherein the set of computer executable instructions are further executable to receive order parameters from the mobile application, the order parameters comprising vehicle features and a selection of an additional product.

6. The data processing system of claim 5, wherein the set of computer executable instructions is further executable to calculate a final payment based on the payment schedule for the selected vehicle and a payment for the additional product.

7. The data processing system of claim 1, wherein the data store stores an approval rule and the set of computer executable instructions is further executable to apply the approval rule to the order.

8. The data processing system of claim 7, wherein the set of computer executable instructions is further executable to receive an indication from the mobile application that the order is finalized and apply the approval rule responsive to the indication that the order is finalized.

9. The data processing system of claim 8, wherein the set of computer executable instructions is further executable to populate a final copy of the electronic agreement document from the order based on a determination that the order is approved and provide the final copy of the electronic agreement to the mobile application for presentation to the user.

10. The data processing system of claim 9, wherein the final copy of the electronic agreement is an electronically executable document, executable by the user via the operator interface of mobile device and wherein the set of computer executable instructions is further executable to receive, at the server, an electronic signature from the user for the final copy the electronic agreement.

11. The data processing system of claim 10, wherein the electronic document associated with the vehicle comprises the final copy of the electronic agreement.

12. A computer program product comprising a computer readable storage medium storing a set of computer executable instructions, the computer executable instructions executable to:
access, by a server, a data store storing a set of inventory records for each vehicle in a program pool of individual vehicles, each inventory record including a payment schedule comprising an initial fee and a periodic fee for an associated individual vehicle;
receive, from a mobile application, a selection of a vehicle from the program pool by a user;
retrieve, by the server, the inventory record for the selected vehicle and provide vehicle information from the inventory record for the selected vehicle to the mobile application for display in an operator interface of a mobile device;
create, at the server, an order to capture information about a transaction, including the vehicle information from the inventory record for the selected vehicle and user information about the user;
store order information in the order at the server, the order information comprising the user information about the user and the vehicle information about the selected vehicle from the inventory record for the selected vehicle;
provide, by the server, access to the order via a dealer portal to allow a dealer associated with the selected vehicle to update the order information;
receive a request from the mobile application to view an electronic document associated with the selected vehicle, wherein the electronic document associated with the selected vehicle includes an electronic agreement;
responsive to the request to view the electronic document, automatically populate the electronic document with the order information; and
communicate the electronic document to the mobile application for presentation in the operator interface of a mobile device.

13. The computer program product of claim 12, wherein the set of computer executable instructions is further executable to generate a unique activation code linked to the order and provide the unique activation code to the mobile application.

14. The computer program product of claim 13, wherein the unique activation code is usable by the dealer portal to access the order.

15. The computer program product of claim 14, wherein the set of computer executable instructions is further executable to push order information to the dealer portal in response to receiving an activation code signal from the dealer portal including the unique activation code.

16. The computer program product of claim 12, wherein the set of computer executable instructions are further executable to receive order parameters from the mobile application, the order parameters comprising vehicle features and a selection of an additional product.

17. The computer program product of claim 16, wherein the set of computer executable instructions is further executable to calculate a final payment based on the payment schedule for the selected vehicle and a payment for the additional product.

18. The computer program product of claim 12, wherein the data store stores an approval rule and the set of computer executable instructions is further executable to apply the approval rule to the order.

19. The computer program product of claim 18, wherein the set of computer executable instructions is further executable to receive an indication from the mobile application that the order is finalized and apply the approval rule responsive to the indication that the order is finalized.

20. The computer program product of claim 19, wherein the set of computer executable instructions is further executable to populate a final copy of the electronic agreement document from the order based on a determination that the order is approved and provide the final copy of the electronic agreement to the mobile application for presentation to the user.

21. The computer program product of claim 20, wherein the final copy of the electronic agreement is an electronically executable document, executable by the user via the operator interface of mobile device and wherein the set of computer executable instructions is further executable to receive, at the server, an electronic signature from the user for the final copy the electronic agreement.

22. The computer program product of claim 20, wherein the electronic document associated with the vehicle comprises the final copy of the electronic agreement.

* * * * *